US010799996B2

(12) United States Patent
Furusawa et al.

(10) Patent No.: US 10,799,996 B2
(45) Date of Patent: Oct. 13, 2020

(54) DUST COLLECTOR AND POWER TOOL

(71) Applicant: MAKITA CORPORATION, Anjo-shi, Aichi-ken (JP)

(72) Inventors: Masanori Furusawa, Anjo (JP); Hideki Tsuji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 458 days.

(21) Appl. No.: 15/619,015

(22) Filed: Jun. 9, 2017

(65) Prior Publication Data

US 2017/0355053 A1  Dec. 14, 2017

(30) Foreign Application Priority Data

Jun. 13, 2016 (JP) ................. 2016-117435
Jun. 13, 2016 (JP) ................. 2016-117436

(51) Int. Cl.
*B23Q 11/00* (2006.01)
*B25D 17/20* (2006.01)

(52) U.S. Cl.
CPC ...... *B23Q 11/0071* (2013.01); *B23Q 11/0046* (2013.01); *B25D 17/20* (2013.01)

(58) Field of Classification Search
CPC ............ B23Q 11/0071; B23Q 11/0046; B25D 17/20; Y02P 80/171; B23D 59/006; B23B 2270/62
USPC .............................. 173/198; 408/67; 409/137
See application file for complete search history.

(56) References Cited

U.S. PATENT DOCUMENTS

| 5,090,499 A * | 2/1992 | Cuneo ............... B23Q 11/0046 173/75 |
| 7,425,109 B2 * | 9/2008 | Simm ............... B23Q 11/0046 173/198 |
| 8,424,615 B2 * | 4/2013 | Baumann ............... B25F 5/021 173/170 |
| 8,967,923 B2 * | 3/2015 | Lerch ............... B23Q 11/0071 408/67 |
| 2004/0231871 A1 * | 11/2004 | Arich ............... B23Q 1/0009 173/217 |

(Continued)

FOREIGN PATENT DOCUMENTS

EP  1 872 899 B1  7/2011
JP  2013-035092 A  2/2013

*Primary Examiner* — Thanh K Truong
*Assistant Examiner* — Katie L Gerth
(74) *Attorney, Agent, or Firm* — Oliff PLC

(57) ABSTRACT

A dust collector includes a main body, a sliding part, and a communication passage. The main body includes an internal region disposed between a power tool and a dust storing region. The sliding part is held by the main body so as to be slidable in a first direction while partly protruding out of the main body through an opening and partly disposed in the internal region. The communication passage extends in a second direction crossing the first direction within the internal region. When the sliding part is placed at a closest position, a distance in the first direction between the opening and an innermost end of the sliding part is longer than a distance between the opening and the communication passage. The sliding part includes an interference avoiding part configured to avoid interference with the communication passage when the sliding part is placed at the closest position.

20 Claims, 12 Drawing Sheets

(56) References Cited

U.S. PATENT DOCUMENTS

2013/0031879 A1\* 2/2013 Yoshikane ......... B23Q 11/0046
                                                              55/356

\* cited by examiner

DUST COLLECTOR AND POWER TOOL

CROSS-REFERENCE TO RELATED APPLICATION

The present application claims priority to Japanese patent application Nos. 2016-117435 and 2016-117436, both of which were filed on Jun. 13, 2016. The contents of the foregoing applications are incorporated herein by reference in their entirety.

TECHNICAL FIELD

The present invention relates to a dust collector that is configured to be removably attached to a power tool and a power tool having the dust collector.

BACKGROUND

A dust collector is known which is attached to a power tool such as a drill and a hammer drill and sucks dust generated during drilling operation. For example, a dust collector disclosed in European Patent No. 1872899 is configured to suck dust together with air through a suction port by utilizing an air flow generated by a suction fan of the power tool and transfer the dust to a dust storing part via a hose. In this dust collector, elongate guide rails for holding the hose is held by a housing so as to be slidable in a longitudinal direction, and the guide rail are pushed into the housing as drilling operation proceeds and a tool accessory is driven into a workpiece.

SUMMARY

In the housing of the above-described dust collector, a passage is provided to lead the air which has passed through the dust storing part to the power tool. The passage extends from the dust storing part and is open to the power tool side of the housing. Therefore, the length of the guide rails are set such that the guide rails do not reach the passage even when the guide rails are pushed most deeply into the housing. Therefore, when a tool accessory having a long overall length is used, a problem arises that the length of the guide rails cannot cope with the length of the tool accessory.

Accordingly, it is an object of the present invention to provide a dust collector which is more widely applicable according to the overall length of a tool accessory to be used, and a power tool having the same.

According to one aspect of the present invention, the dust collector is provided which is configured to be removably attached to a power tool for performing a processing operation on a workpiece by driving a tool accessory and to collect dust generated during the processing operation by utilizing an air flow generated by the power tool. The dust collector includes a main body, a sliding part and a communication passage.

The main body is configured to be removably attached to the power tool. The main body includes a dust storing region, an internal region and an opening. The dust storing region is configured to store dust. The internal region is disposed between the power tool and the dust storing region when the dust collector is attached to the power tool. The opening is configured to provide communication between the internal region and the outside of the main body.

The sliding part has an elongate shape. The sliding part is held by the main body so as to be slidable in a specified first direction while partly protruding out of the main body through the opening and partly disposed in the internal region. Further, the sliding part has a suction port for the dust and at least part of a dust transfer passage. The dust transfer passage connects the suction port and the dust storing region. The dust transfer passage is configured to allow the dust to be transferred through the dust transfer passage.

The communication passage extends in a second direction crossing the first direction within the internal region. The communication passage is configured to provide communication between the dust storing region and a passage for the air flow which is formed in the power tool, when the dust collector is attached to the power tool.

The sliding part is movable with respect to the main body in the first direction between a farthest position and a closest position. The farthest position is a position in which the suction port is located farthest away from the opening. The closest position is a position in which the suction port is located closest to the opening. When the sliding part is placed at the closest position, a distance in the first direction between the opening and an innermost end of the sliding part is longer than a distance between the opening and the communication passage in the first direction. The innermost end of the sliding part herein refers to an end of the sliding part which is located at an innermost position in the main body with respect to the opening. The sliding part includes an interference avoiding part which is configured to avoid interference with the communication passage when the sliding part is placed at the closest position.

In the dust collector having such a structure, when the sliding part is placed at the closest position, that is, when the sliding part enters most deeply into the body, the innermost end of the sliding part is located farther away from the opening than the communication passage in the internal region. By providing the interference avoiding part in the sliding part, interference of the sliding part with the communication passage can be avoided even when the sliding part is placed at the closest position. Therefore, compared with a known structure in which the length of the sliding part is set such that the sliding part does not reach the communication passage when the sliding part is placed at the closest position, the dust collector is realized which can be used with a longer tool accessory.

In one aspect of the dust collector according to the present invention, the interference avoiding part may be configured as a space which is formed in the sliding part. The space may extend through the sliding part in the second direction and extend continuously up to the innermost end in the first direction. The space may include at least a region in which the communication passage is disposed when the sliding part is placed at the closest position. In this manner, by providing the interference avoiding part in the form of a space formed in the sliding part, the sliding part can be formed in a simpler structure as a whole, compared with a structure in which the interference avoiding part is formed by any member.

In one aspect of the dust collector according to the present invention, the space may be configured such that at least one end of the space is located in the internal region when the sliding part is placed at the farthest position. The one end of the space is an end to be disposed on the power tool side when the dust collector is attached to the power tool. If the space is provided in a part of the sliding part which protrudes to the outside from the opening of the main body, the dust may enter the sliding part and thus the inside of the main body through the space. Particularly, the dust is more likely to enter from the power tool side in the second direction. According to the present aspect, when the sliding part is placed at the farthest position protruding most from the opening, at least the one end of the space on the power tool side is located in the internal region, so that the risk of entry of dust is reduced.

In one aspect of the dust collector according to the present invention, the main body may include an engagement part and an operation member. The engagement part may be provided on a power tool side of the main body, which faces the power tool in the second direction when the dust collector is attached to the power tool. The engagement part is configured to be removably engaged with a tool body of the power tool. The operation member may be provided on the same side as the engagement part in the second direction. The operation member may be configured to switch between a first state and a second state in response to an external manual operation. The first state may maintain engagement between the tool body and the engagement part. The second state may allows release of the engagement. By thus providing the engagement part which is removably engaged with the tool body of the power tool and the operation member for switching the engagement state, both on the same side (on the power tool side) in the main body, the attaching/detaching operation can be facilitated.

In one aspect of the dust collector according to the present invention, the operation member may be configured to be manually operable in the second direction. It is likely that the user often puts his or her thumb on the power tool side in the second direction when attaching and detaching the dust collector. Therefore, such a structure can further facilitate the operation of the operation member.

In one aspect of the dust collector according to the present invention, the sliding part may include a pair of guide rails and a positioning member. The pair of guide rails may be spaced apart from each other and extend generally in parallel in the first direction. The positioning member may be held by the pair of guide rails so as to be movable in the first direction with respect to the sliding part. The positioning part may be configured to engage with the pair of guide rails. Further, the positioning member may be configured to adjust a protrusion length or an insertion length of the sliding part from the opening in the first direction. With such a structure, a protrusion length corresponding to the length of the tool accessory to be actually used, or an insertion length corresponding to a desired amount of the workpiece to be processed by the tool accessory can be adjusted with the positioning member. Further, with the structure in which the positioning member is held by the pair of guide rails, the positioning member can be stably moved in the first direction along the guide rails.

In one aspect of the dust collector according to the present invention, the dust transfer passage may include a first part and a second part. The first part may extend in the first direction within the sliding part. The second part may extend in the second direction and connect the first part and the dust storing region. The second part may be disposed between the communication passage and the opening in the first direction. The sliding part may include a transfer passage interference avoiding part which is configured to avoid interference with the second part when the sliding part is placed at the closest position.

In one aspect of the dust collector according to the present invention, the transfer passage interference avoiding part may be configured as a space formed in the sliding part. The transfer passage interference avoiding part may extend from the dust storing region side toward the power tool side in the second direction and may also extend continuously up to the innermost end in the first direction. The transfer passage interference avoiding part may include at least a region in which the second part is disposed when the sliding part is placed at the closest position.

In one aspect of the dust collector according to the present invention, the dust collector may further include a conductive member which is disposed in the internal region and connected to the dust storing region via a conductive path.

According to one aspect of the present invention, there is provided a power tool which is configured to perform a processing operation on a workpiece by driving a tool accessory. The power tool includes a fan that is configured to generate an air flow for sucking dust generated during the processing operation, a tool body that houses the fan and includes a passage for the air flow, and a dust collector which is removably attached to the tool body. Any one of the dust collectors in the above-described aspects may be employed as the dust collector. With such a power tool, the air flow for sucking the dust can be formed in the dust collector, so that it is not necessary for the dust collector to additionally include a mechanism for forming such air flow. Further, the above-described effect which is realized by the dust collector can also be obtained.

DETAILED DESCRIPTION OF THE EMBODIMENTS

Embodiments are now explained with reference to the drawings. In the following embodiments, an electric hammer drill is described as an example of a power tool which is configured to perform a processing operation by driving a tool accessory. Further, a dust collector which is configured to be removably attached to the hammer drill is described.

First Embodiment

A hammer drill 1 and a dust collector 4 according to a first embodiment are explained with reference to FIGS. 1 to 10.

Figure 1:
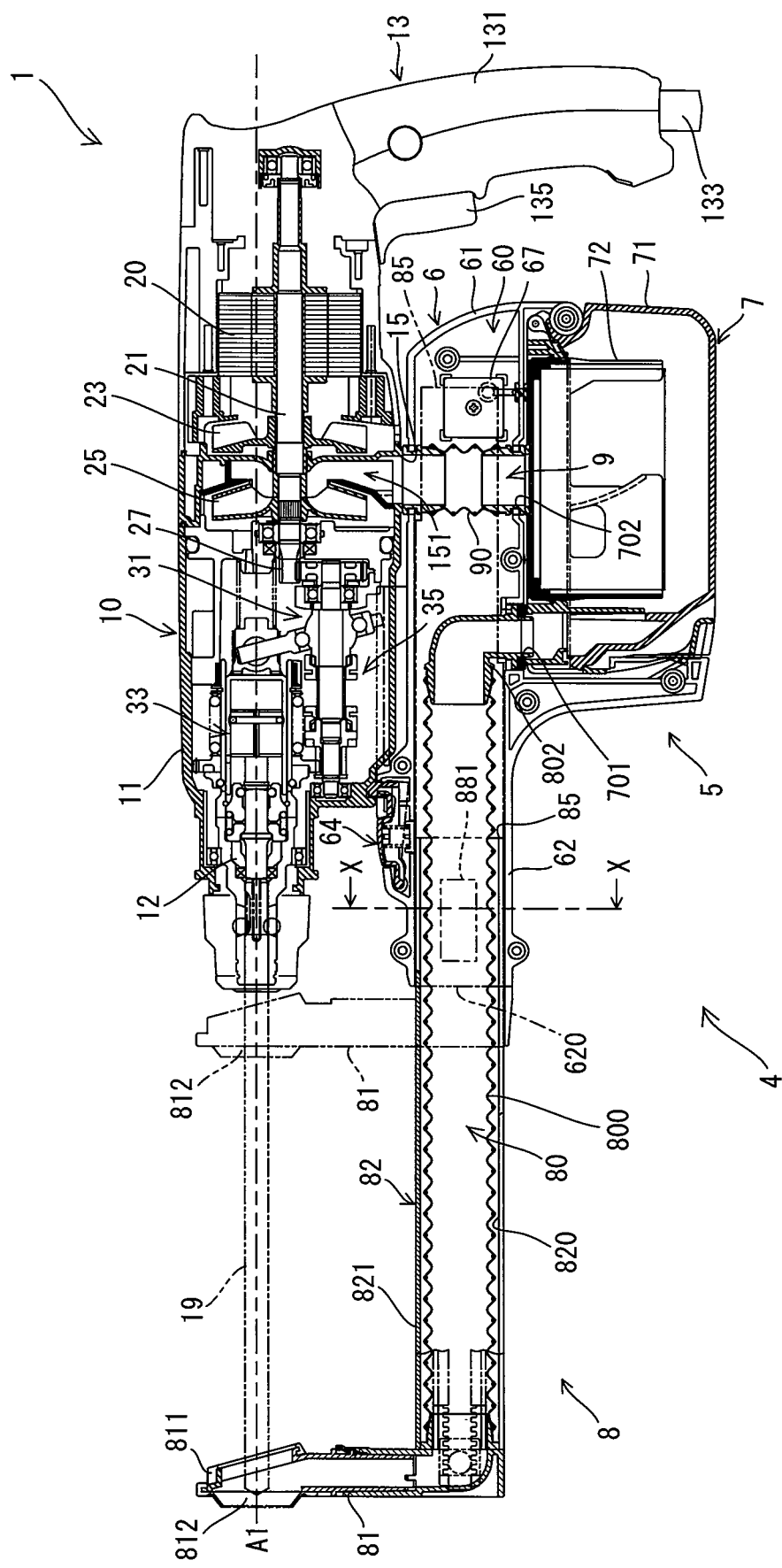
FIG. 1 is a longitudinal sectional view showing a hammer drill to which a dust collector according to a first embodiment is attached.

An overall structure of the hammer drill 1 is briefly described with reference to FIG. 1. As shown in FIG. 1, the hammer drill 1 includes a main body 10 and a handle 13. The main body 10 has an elongate form. A tool holder 12 to which a tool accessory 19 can be removably attached is provided in one end part of the main body 10 in its longitudinal direction. From the other end part of the main body 10, the handle 13 extends in a direction crossing the longitudinal direction of the main body 10. As the tool accessories 19 which can be attached to the tool holder 12, a plurality of tools (such as a drill bit and a hammer bit) of different kinds and lengths are available, corresponding to various processing operations.

The hammer drill 1 of the present embodiment is configured to perform an operation (hammering operation) in which the tool accessory 19 is linearly driven along a specified hammering axis A1 and an operation (drilling operation) in which the tool accessory 19 is rotationally driven around the hammering axis A1. A user may select the tool accessory 19 of appropriate kind and length according to a processing operation to be performed and attach the tool accessory 19 to the tool holder 12 in such a manner that an axial direction of the tool accessory 19 coincides with the hammering axis A1. Further, in the hammer drill 1 of the present embodiment, the hammering axis A1 extends in the longitudinal direction of the main body 10.

The structures of the main body 10 and the handle 13 are now explained in detail. In the following description, for convenience sake, the longitudinal direction of the main body 10 (also referred to as the direction of the hammering axis A1 or the axial direction of the tool accessory 19) is defined as a front-rear direction of the hammer drill 1. Here, the tool holder 12 side is defined as a front side of the hammer drill 1 and the handle 13 side is defined as a rear side. Further, a direction which is perpendicular to the longitudinal direction of the main body 10 and which corresponds to the extending direction of the handle 13 is defined as an up-down direction. Here, one side of the handle 13 connected to the main body 10 is defined as an upper side and the other side of the handle 13 having a distal end (free end) is defined as a lower side.

The main body 10 is explained with reference to FIGS. 1 and 2. The main body 10 includes a body housing 11, the tool holder 12, a motor 20, a motion converting mechanism 31, a striking element 33 and a rotation transmitting mechanism 35. The structures of these members are now explained.

As shown in FIG. 1, the body housing 11 is a housing which forms an outer shell of the main body 10. The body housing 11 houses the tool holder 12, the motor 20, the motion converting mechanism 31, the striking element 33 and the rotation transmitting mechanism 35. The body housing 11 may be formed by connecting a plurality of parts such as a part for housing the motor 20 and a part for housing a driving mechanism (the motion converting mechanism 31, the striking element 33, the rotation transmitting mechanism 35) for the tool accessory 19, or may be formed by a single part. Further, the body housing 11 may be formed in a single-layer structure or in a two-layer structure having an outer housing which forms the outer shell of the main body 10 and an inner housing which is arranged within the outer housing and houses internal mechanisms.

An intake port 15 is formed in a lower end surface of a central region of the body housing 11 in the front-rear direction. The intake port 15 is a through hole for providing communication between the inside and the outside of the body housing 11. The intake port 15 is configured to communicate with a communication passage 9 of the dust collector 4 when the dust collector 4 is attached to the hammer drill 1, which will be described below in detail. The body housing 11 also has an exhaust port (not shown) for discharging air which has been taken in from the intake port 15 and then passed through an air passage 151.

Figure 2:
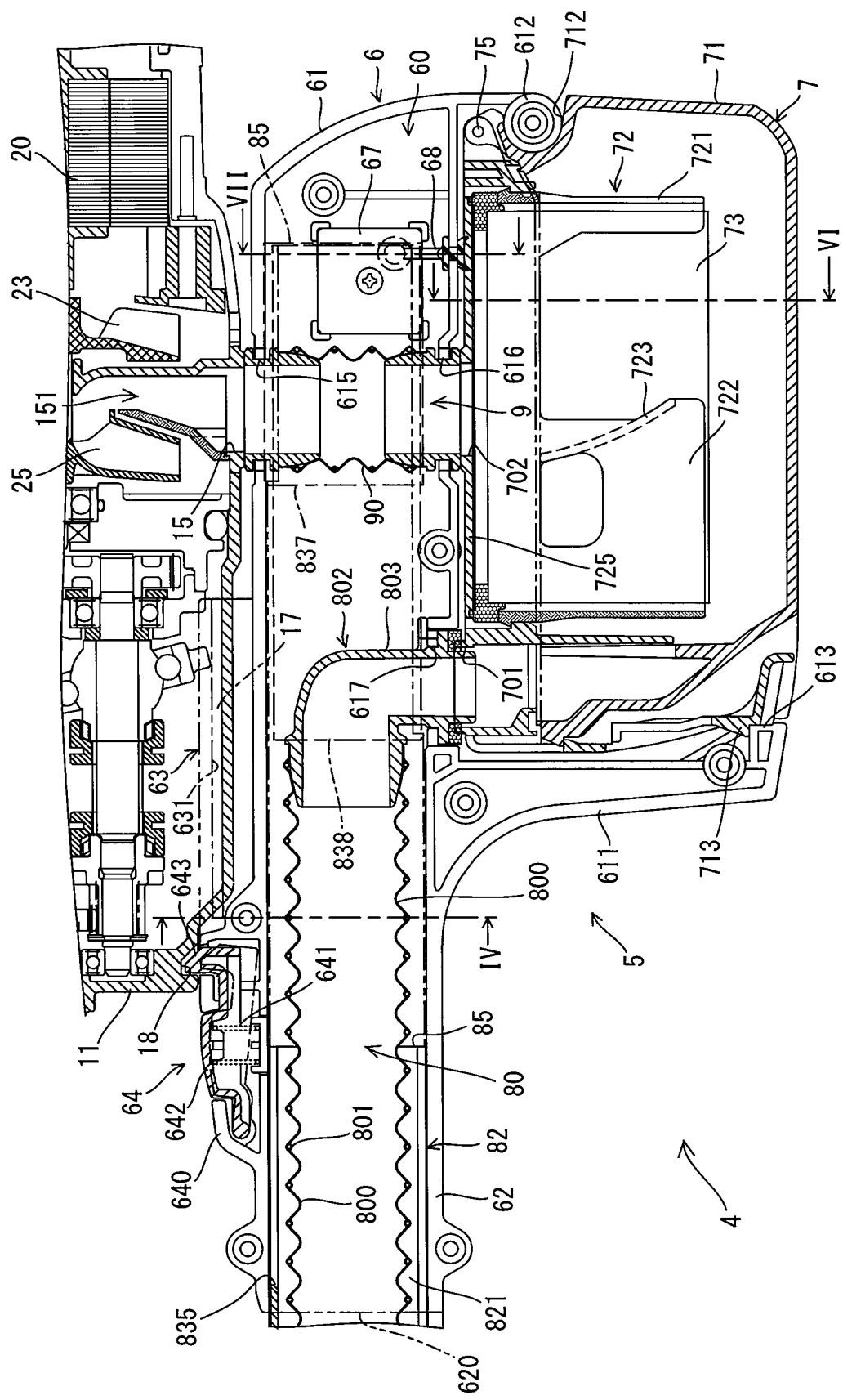
FIG. 2 is an enlarged view showing a main body of the dust collector and its peripheral part in FIG. 1.

As shown in FIG. 2, a pair of right and left guide rails 17 are provided on a lower end part of the body housing 11. The guide rails 17 extend in the front-rear direction from the front of the intake port 15 to the lower front end part of the body housing 11. The guide rails 17 are configured to engage with an engagement part 63 of the dust collector 4 which is described below. Further, an engagement recess 18 is formed in a lower front end part (in front of the guide rails 17) of the body housing 11. The engagement recess 18 is recessed upward from the lower end surface of the body housing 11 and configured to engage with a projection 643 of an operation member 64 of the dust collector 4 which is described below.

In the present embodiment, an alternate current motor is employed as the motor 20 which serves as a driving source for driving the tool accessory 19. As shown in FIG. 1, the motor 20 is disposed within a rear region of the body housing 11 such that an axis of an output shaft 21 of the motor 20 extends in parallel to the hammering axis A1 (i.e., in the front-rear direction). A cooling fan 23 for cooling the motor 20 and a dust collecting fan 25 are fixedly mounted onto the output shaft 21. The dust collecting fan 25 is disposed in front of the cooling fan 23. The dust collecting fan 25 is configured to generate an air flow for sucking dust which is generated during the processing operation of the tool accessory 19. Further, the dust collecting fan 25 is disposed above the above-described intake port 15. A driving gear 27 is mounted onto a front end of the output shaft 21. The cooling fan 23, the dust collecting fan 25 and the driving gear 27 rotate together with the output shaft 21.

The motion converting mechanism 31, the striking element 33 and the rotation transmitting mechanism 35 are disposed within a front region of the body housing 11. A rotating power of the motor 20 is transmitted to the motion converting mechanism 31 and the rotation transmitting mechanism 35 via the driving gear 27. The motion converting mechanism 31 is configured to convert rotation of the output shaft 21 into reciprocating motion of a piston in the direction of the hammering axis A1 by swinging movement of a swinging ring. The striking element 33 is configured to apply a striking force to the tool accessory 19 in the direction of the hammering axis A1 along with the reciprocating motion of the piston. The tool accessory 19 is linearly driven in the direction of the hammering axis A1 by the motion converting mechanism 31 and the striking element 33 when the motor 20 is driven. The rotation transmitting mechanism 35 includes a plurality of gears and is configured to appropriately reduce the speed of the rotating power of the motor 20 and then transmit it to the tool accessory 19 via a final shaft in the form of the tool holder 12. The tool accessory 19 is rotationally driven around the hammering axis A1 by the rotation transmitting mechanism 35 when the motor 20 is driven. The motion converting mechanism 31, the striking element 33 and the rotation transmitting mechanism 35 are well-known in the field and will not be further elaborated here.

The hammer drill 1 of the present embodiment is configured such that any of three modes (hammer drill mode, drill mode and hammer mode) can be selected by an operation of a mode change lever (not shown) provided on the main body 10. In the hammer drill mode, hammering operation and drilling operation are performed by driving the motion converting mechanism 31 and the rotation transmitting mechanism 35. In the hammer mode, only hammering operation is performed by driving only the motion converting mechanism 31 while interrupting power transmission in the rotation transmitting mechanism 35. In the drill mode, only the drilling operation is performed by driving only the rotation transmitting mechanism 35 while interrupting power transmission in the motion converting mechanism 31. It is especially useful to use the dust collector 4 of the present embodiment when the hammer drill 1 is operated in the hammer drill mode or drill mode (in other words, when a processing operation involving a drilling operation is performed). Further, a structure for such mode switching is well-known and will not be elaborated here.

The handle 13 is now explained with reference to FIG. 1. The handle 13 is an elongate part which extends downward from a rear end part of the main body 10. The handle 13 includes a handle housing 131 that forms an outer shell of the handle 13, a power cable 133 and a trigger 135. The handle housing 131 may be formed separately from the body housing 11 and connected to the body housing 11, or it may be integrally formed with at least part of the body housing 11.

The power cable 133 for connection to an external AC source extends from a lower end of the handle housing 131. The trigger 135 is provided in a front upper part of the handle housing 131. The handle housing 131 houses a switch and a controller (not shown). The motor 20, the power cable 133 and the switch are electrically connected to the controller. When a user depresses the trigger 135, the switch is turned on and then the motor 20 is energized. The driving of the motor 20 is controlled by the controller.

An overall structure of the dust collector 4 is now briefly explained with reference to FIG. 1. The dust collector 4 is used in a state where the dust collector 4 is attached to the hammer drill 1. Therefore, in the following description, for convenience sake, directions of the dust collector 4 are defined to correspond to the directions of the hammer drill 1 with the dust collector 4 attached thereto.

As shown in FIG. 1, the dust collector 4 includes a main body 5 and a sliding part 8. The main body 5 is configured to be removably attached to a lower side of the main body 10 of the hammer drill 1. A dust container 7 for storing dust is removably provided in a lower part of the main body 5. The sliding part 8 is L-shaped as viewed from the side. The sliding part 8 has a suction port 812 for dust on its front end. The sliding part 8 is held by the main body 5 so as to be slidable in a direction parallel to the hammering axis A1 (i.e. in the front-rear direction), while part of the sliding part 8 including the suction port 812 protrudes forward from the main body 5. A dust transfer passage 80 extends through the sliding part 8 and is connected to the dust container 7 of the main body 5. The dust which is sucked through the suction port 812 may be transferred through the dust transfer passage 80. Further, when the dust collector 4 is attached to the hammer drill 1, the dust container 7 is connected to the intake port 15 of the hammer drill 1 via the communication passage 9.

When the motor 20 of the hammer drill 1 is driven, an air flow is generated by the dust collecting fan 25 which rotates together with the output shaft 21. The air flow is led through the intake port 15 into the body housing 11. By this air flow, suction force is applied to the suction port 812 through the communication passage 9, the dust container 7 and the dust transfer passage 80 of the dust collector 4. The dust generated by the processing operation is sucked through the suction port 812 together with air by this suction force and flows through the dust transfer passage 80 and then into the dust container 7. In the dust container 7, only the dust is separated from the air and stored. The air from which the dust has been separated flows through the communication passage 9 and then into the body housing 11 of the hammer drill 1 from the intake port 15, and is discharged from the exhaust port (not shown). The dust collector 4 is thus configured to collect the dust utilizing the air flow which is generated by the dust collecting fan 25 of the hammer drill 1.

Figure 3:
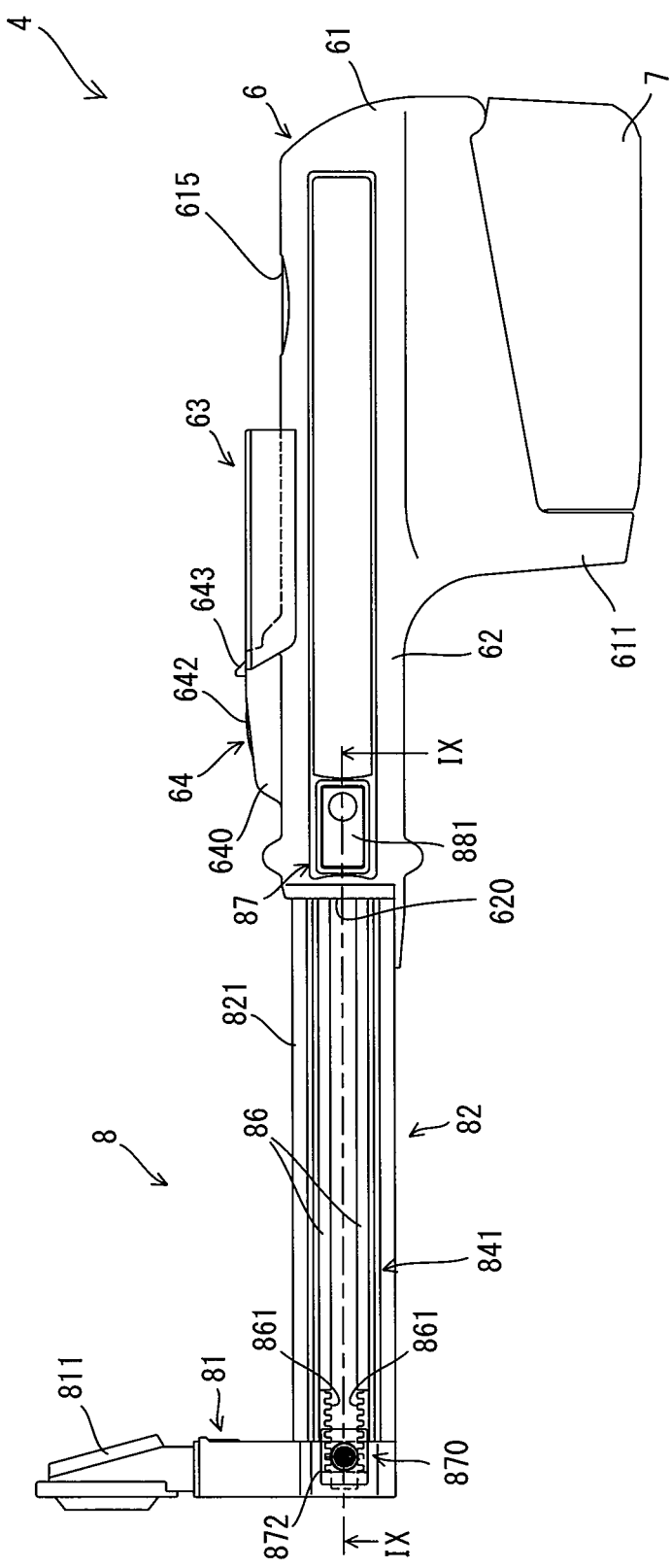
FIG. 3 is a left side view of the dust collector (with a communication passage forming part removed therefrom).

The main body 5 and the sliding part 8 are now explained in detail. First, the structure of the main body 5 is explained. As shown in FIGS. 2 and 3, in the present embodiment, the outer shell of the main body 5 is formed mainly by a body housing 6 and the dust container 7. The body housing 6 has an elongate shape corresponding to the main body 10 of the hammer drill 1 and is configured to be removably attached to the main body 10. The dust container 7 has a generally rectangular box-like shape as a whole and is removably mounted to the lower side of the body housing 6.

Figure 4:
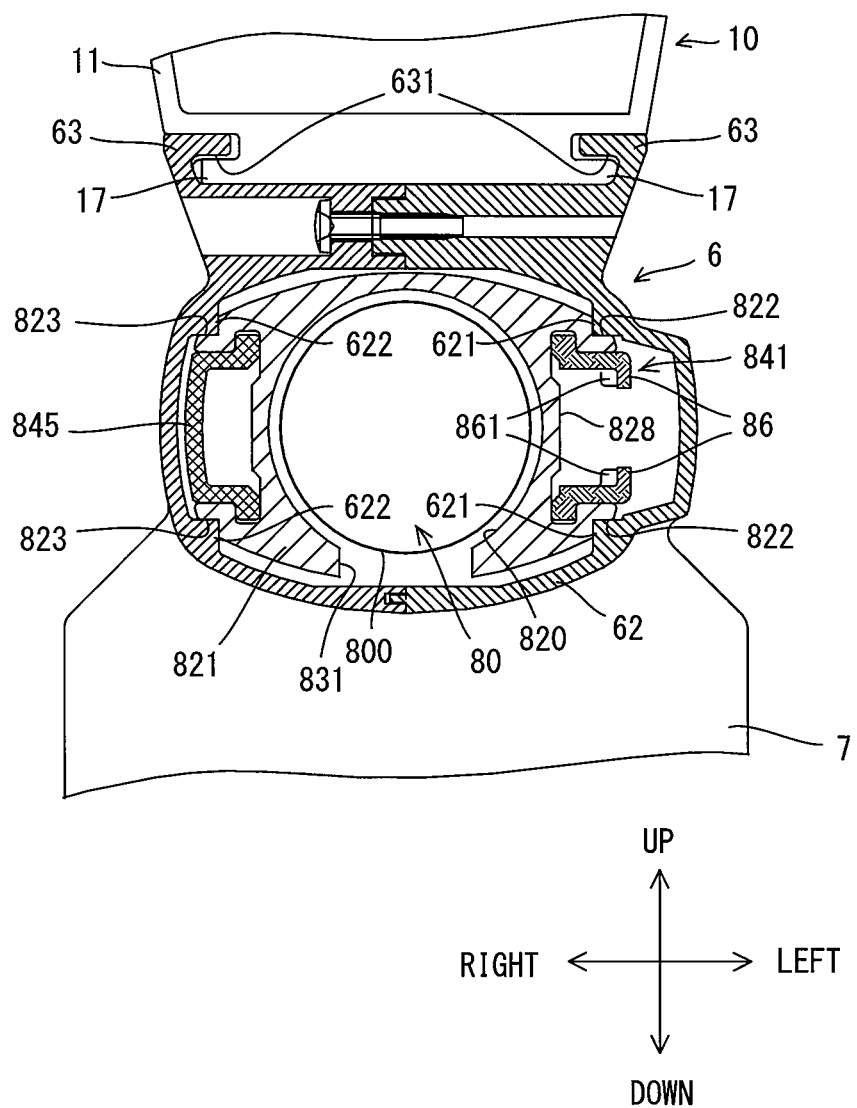
FIG. 4 is a sectional view taken along line IV-IV in FIG. 2 (with a sliding part placed in the closest position).

The structure of the body housing 6 is now explained with reference to FIGS. 2 to 4. As shown in FIG. 3, the body housing 6 includes a box-like part 61 that forms a rear part of the body housing 6 and a cylindrical part 62 that forms a front part of the body housing 6. The dust container 7 is removably attached to the box-like part 61. The box-like part 61 has a generally rectangular box-like shape and has a protrusion 611 protruding downward from its front end part. The cylindrical part 62 mainly serves to hold the sliding part 8 such that the sliding part 8 is slidable in the front-rear direction. The cylindrical part 62 has a cylindrical shape having a generally rectangular section as shown in FIG. 4. In the present embodiment, the body housing 6 is formed of resin and the box-like part 61 and the cylindrical part 62 are integrally formed with each other.

As shown in FIGS. 2 to 4, the engagement part 63 is provided on an upper end of the body housing 6. The engagement part 63 is configured to be engaged with and disengaged from the main body 10 (specifically, the body housing 11) of the hammer drill 1. More specifically, the engagement part 63 includes a pair of protrusions which protrude upward from the right and left upper ends of the body housing 6 and extend in the front-rear direction. The engagement part 63 has a longitudinal length corresponding to the length of the pair of the guide rails 17 provided on the body housing 11 of the hammer drill 1. A pair of guide grooves 631 are formed on the inside of the engagement part 63 (i.e. the protrusions) and configured to slidably engage with the guide rails 17.

As shown in FIG. 2, the operation member 64 is provided in front of the engagement part 63. The operation member 64 is disposed within a housing part 640 provided above the cylindrical part 62. A biasing spring 641 is disposed between the operation member 64 and an upper surface of the cylindrical part 62. The operation member 64 is held such that it can swing in the up-down direction on its front end locked within the housing part 640. The operation member 64 has a projection 643 on its rear end and a pressing part 642 in its center. The projection 643 is configured to engage with the engagement recess 18 of the hammer drill 1. The pressing part 642 is configured to be pressed from outside by a user. The operation member 64 is normally biased upward by the biasing spring 641. Therefore, the projection 643 protrudes upward from an opening of an upper surface of the housing part 640, and the pressing part 642 is exposed upward from an opening of the upper surface of the housing part 640.

In order to attach the dust collector 4 to the hammer drill 1, the dust collector 4 is slid rearward with respect to the hammer drill 1 by the user, while the guide rails 17 are engaged with the guide grooves 631 of the engagement part 63. In the process of moving the dust collector 4 to a specified position, the projection 643 is pressed against the front end of the body housing 11 and once moved downward against the biasing force of the biasing spring 641. Thereafter, the projection 643 is biased by the biasing spring 641 and engaged with the engagement recess 18. In this manner, attaching of the dust collector 4 to the hammer drill 1 is completed. The projection 643 is engaged with the engagement recess 18 and prevents the body housing 11 and the body housing 6 from moving with respect to each other in the front-rear direction, so that engagement between the guide grooves 631 and the guide rails 17 is maintained.

When the user presses the pressing part 642 downward, the operation member 64 swings downward against the biasing force of the biasing spring 641 and the projection 643 is disengaged from the engagement recess 18. In this state, when the user moves the dust collector 4 forward with respect to the hammer drill 1, the dust collector 4 can be removed from the hammer drill 1. Thus, the operation member 64 is configured to switch between a state of maintaining engagement with the hammer drill 1 (the guide rails 17) by the engagement part 63 and a state of allowing release of the engagement.

The box-like part 61 of the body housing 6 has a structure for holding the dust container 7. Specifically, as shown in FIG. 2, a cylindrical rotary support part 612 is provided on a lower rear end of the box-like part 61. The cylindrical rotary support part 612 extends in a left-right direction. Further, an engagement part 613 is provided to protrude rearward from a lower end of the protrusion 611. The engagement part 613 extends in the left-right direction. The rotary support part 612 and the engagement part 613 are respectively engaged with a rotary engagement part 712 and an engagement protrusion 713 of the dust container 7 which are described below, so that the dust container 7 is attached to the body housing 6.

A structure for holding the sliding part 8 so as to be slidable in the front-rear direction is provided within the body housing 6. Specifically, as shown in FIG. 4, a pair of guide rails 621 are provided on a left inner surface of the body housing 6. The guide rails 621 protrude inward while being spaced apart from each other in the up-down direction and extending in the front-rear direction. A pair of guide rails 622 are also similarly provided on a right inner surface of the body housing 6. The guide rails 621, 622 are configured to slidably engage with engagement recesses 822, 823 of the sliding part 8, which will be described below in detail.

As shown in FIG. 2, an internal region 60 formed within the body housing 6 (in other words, a space region contiguously formed within the box-like part 61 and the cylindrical part 62) is a region of the main body 5 that is disposed between the hammer drill 1 and the dust container 7 when the dust collector 4 is attached to the hammer drill 1. The internal region 60 communicates with the outside of the main body 5 via an opening 620 that is formed on the front end of the cylindrical part 62. Part of the sliding part 8 which is inserted from the opening 620 and part of the dust transfer passage 80 (more specifically, part of a hose 800 and a hose connecting part 802 which define the dust transfer passage 80) are disposed in the internal region 60. As described above, with the structure in which the sliding part 8 is slidable in the front-rear direction, the length of insertion of the sliding part 8 into the internal region 60, or the position of a rear end 85 of the sliding part 8 which is located at an innermost (deepest or rearmost) position in the body housing 6 with respect to the opening 620, may change. Arrangement of the sliding part 8 and the dust transfer passage 80 in the internal region 60 is described below in further detail. Further, the communication passage 9 and a conductive member 67 are disposed in the internal region 60. The communication passage 9 and a conductive member 67 are explained after the dust container 7 is explained.

Figure 5:
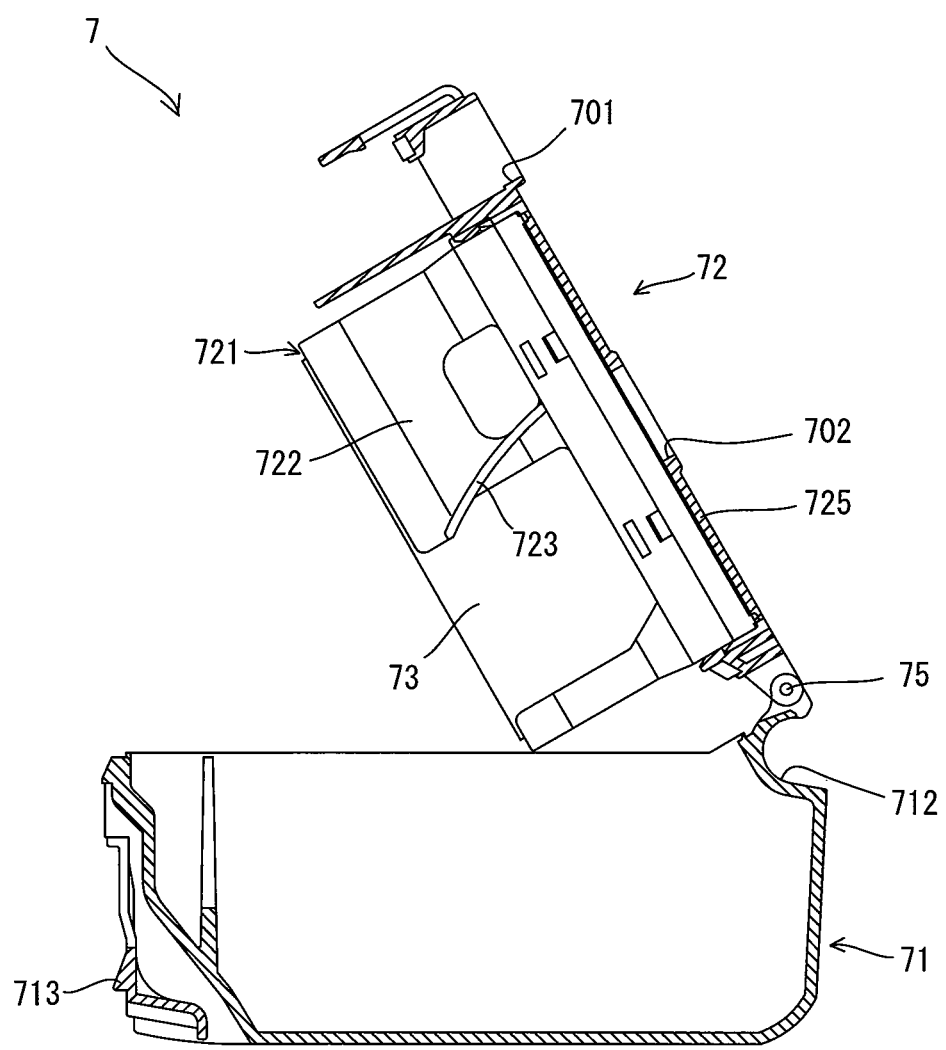
FIG. 5 is a left side view of a dust container with a filter holder opened.

The structure of the dust container 7 is now explained with reference to FIGS. 2, 5 and 6. As shown in FIG. 5, the dust container 7 mainly includes a container body 71 and a filter holder 72 which is connected to an upper rear end of the container body 71 via a connecting pin 75.

The container body 71 which serves as a storing part for dust is made of resin and formed as a box-like member having a totally open top.

The filter holder 72 is configured to be rotatable around the connecting pin 75 with respect to the container body 71 and open and close the open top of the container body 71. In other words, the filter holder 72 also serves as a lid of the container body 71. FIG. 2 shows the closed state of the container body 71, and FIG. 5 shows the open state of the container body 71. In the present embodiment, a top surface 725 of the filter holder 72 is formed of conductive material, and the other parts of the filter holder 72 are formed of nonconductive material such as resin and rubber. For example, conductive resin (resin that has been subjected to a process of filling carbon black or metal powder or a process of forming a metallized film on the surface) or conductive rubber (rubber mixed with carbon black or metal powder) may be preferably used as the conductive material.

As shown in FIG. 5, an inlet 701 and an outlet 702 are formed in the top surface 725 of the filter holder 72. The inlet 701 and the outlet 702 provide communication between the inside and the outside of the dust container 7 when the container body 71 is closed. Through the inlet 701, dust-containing air which is sucked through the suction port 812 (see FIG. 1) and led through the dust transfer passage 80 flows into the dust container 7. Through the outlet 702, the air from which the dust has been separated by a filter 73 flows out of the dust container 7. The inlet 701 is formed in a front end part of the top surface 725, and the outlet 702 is formed in the center of the top surface 725. When the dust container 7 is attached to the body housing 6, the dust transfer passage 80 and the communication passage 9 are connected to the inlet 701 and the outlet 702, respectively, which will be described below in detail.

The filter holder 72 has a flame 721. The flame 721 protrudes downward from the top surface 725 and is configured such that the filter 73 is removably attached to the flame 721. The filter 73 is formed of a material having air permeability such as paper and nonwoven fabric and configured to separate the dust from the air that has been led into the container body 71. The user can open the container body 71 as shown in FIG. 5 and remove the filter 73 from the flame 721 for replacement when a certain amount of dust sticks to the filter 73.

Figure 6:
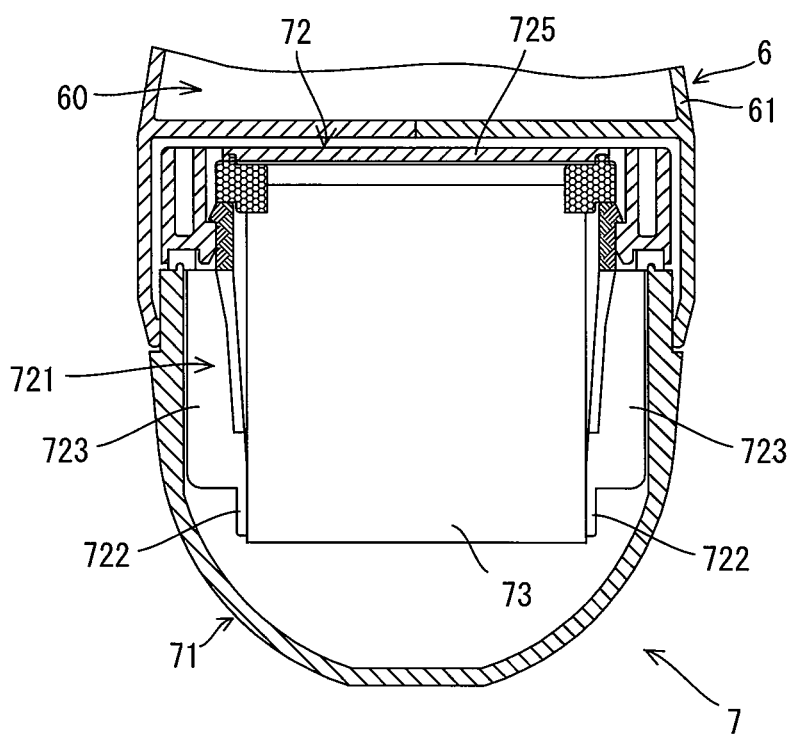
FIG. 6 is a sectional view taken along line VI-VI in FIG. 2.

As shown in FIG. 6, a rib 723 is provided on each of a pair of right and left side parts 722 of the flame 721. The pair of ribs 723 protrude outward from the side parts 722 in the left-right direction and substantially extend up to the container body 71 in the closed state of the container body 71. Further, as shown in FIG. 2, the rib 723 is formed in a circular arc shape extending substantially downward from the upper end of the side part 722 as viewed from the side, and is gently curved and inclined rearward toward the downward side. Further, the upper end of the rib 723 is arranged slightly forward of the outlet 702 in the front-rear direction.

The user may perform a processing operation while holding the hammer drill 1 with the tool accessory 19 pointed downward. In such a case, the front side (left side as viewed in FIG. 2) of the dust container 7 is positioned downward. Therefore, the dust which is not caught by the filter 73 within the dust container 7 moves downward by its own weight and accumulates in the vicinity of the inlet 701 formed in the front end part of the dust container 7, which may cause reduction of the suction force. In the present embodiment, however, even when the front side of the dust container 7 is positioned downward, the rib 723 can receive the dust moving downward by its own weight, so that the dust can be prevented from accumulating in the vicinity of the inlet 701. Further, when disposing of the dust collected in the container body 71, the user lifts up the filter holder 72 as shown in FIG. 5. At this time, the circular arc rib 723 rotates around the connecting pin 75, so that the dust accumulated on the rib 723 is smoothly led into the container body 71. Therefore, disposal of dust can be efficiently performed.

The container body 71 has a structure for removably attaching the dust container 7 to the body housing 6. Specifically, as shown in FIG. 5, the rotary engagement part 712 and the engagement protrusion 713 are respectively provided on the upper rear end part and the lower front end part of the container body 71. The rotary engagement part 712 is formed as a recess having a semi-circular section corresponding to the rotary support part 612 of the body housing 6. The rotary engagement part 712 is configured to engage with the rotary support part 612 so as to be rotatable around the rotary support part 612. The engagement protrusion 713 is formed as a projection protruding forward and configured to engage with the engagement part 613 of the body housing 6. In order to attach the dust container 7 to the body housing 6 (see FIG. 2), the user engages the rotary engagement part 712 with the rotary support part 612 while the front end of the dust container 7 is inclined downward, and engages the engagement protrusion 713 with the engagement part 613 by pushing up the front end of the dust container 7.

The communication passage 9 and the conductive member 67 provided in the internal region 60 of the body housing 6 are now explained.

The communication passage 9 is explained with reference to FIG. 2. The communication passage 9 is disposed in a rear region of the internal region 60 (a central region inside the box-like part 61) in the front-rear direction. The communication passage 9 extends in the up-down direction and is configured to provide communication between the dust container 7 and the air passage 151 of the hammer drill 1 when the dust collector 4 is attached to the hammer drill 1. More specifically, the communication passage 9 is a passage that connects the outlet 702 of the dust container 7 and the intake port 15 of the hammer drill 1 and defined by a cylindrical communication passage forming part 90. In the present embodiment, the communication passage forming part 90 is configured to be elastically deformable in its axial direction (the up-down direction) as a whole. Upper and lower end parts of the communication passage forming part 90 are each formed of an elastic element and respectively fitted in through holes 615, 616 formed in upper and lower surfaces of the body housing 6, so that the communication passage forming part 90 is held by the body housing 6. Flanges formed on upper and lower ends of the communication passage forming part 90 slightly protrude to the outside of the body housing 6.

When the dust container 7 is attached to the body housing 6, the lower end flange of the communication passage forming part 90 is pressed from above into close contact with a peripheral region of the outlet 702 of the dust container 7. Further, when the dust collector 4 is attached to the body housing 11 of the hammer drill 1, the upper end flange of the communication passage forming part 90 is pressed from below into close contact with a peripheral region of the intake port 15 of the body housing 11. As a result, the inside of the dust container 7 and the air passage 151 of the body housing 11 communicate with each other via the communication passage 9.

Figure 7:
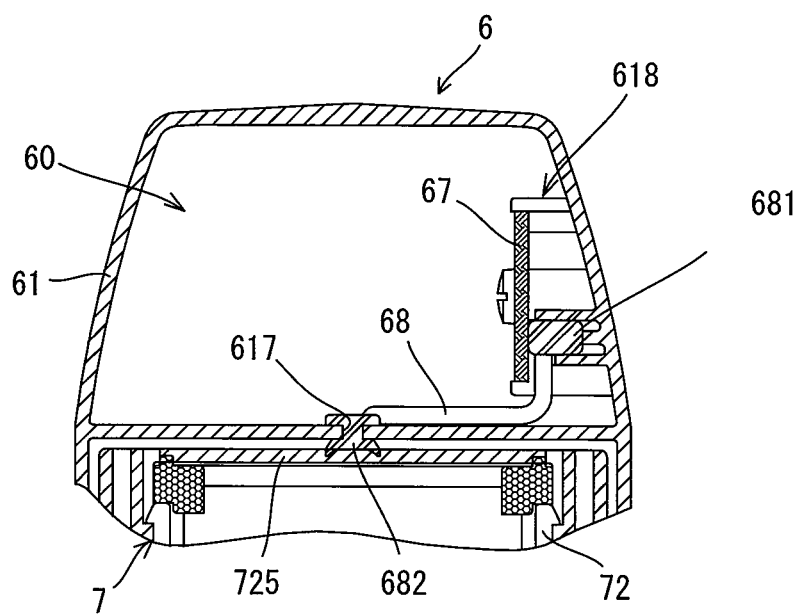
FIG. 7 is a sectional view taken along line VII-VII in FIG. 2.

The conductive member 67 is explained with reference to FIG. 7. The conductive member 67 is provided to prevent static electricity from being charged on the dust container 7. In the present embodiment, the conductive member 67 is configured as a metal plate (such as a steel plate). The conductive member 67 is fastened by a screw to a support part 618. The support part 618 is integrally formed with the box-like part 61 in a rear end part of the box-like part 61. Further, a conductive path 68 that is formed of conductive rubber is connected to the conductive member 67.

In the present embodiment, the conductive path 68 is generally shaped like a cord and both ends of the conductive path 68 are respectively arranged to come in contact with the conductive member 67 and the dust container 7. Specifically, a first end 681 of the conductive path 68 is supported by the support part 618 so as to come in contact with the conductive member 67. Part of a second end 682 of the conductive path 68 slightly protrudes downward from a through hole 617 formed in the lower surface of the box-like part 61. When the dust container 7 is attached to the body housing 6, the second end 682 of the conductive path 68 is pressed from above into close contact with the top surface 725 of the filter holder 72. Thus, the top surface 725 formed of a conductive material and the conductive member 67 are electrically connected to each other via the conductive path 68. Further, the contact between the dust container 7 and the body housing 6 is buffered by the presence of the second end 682 disposed between the top surface 725 and the lower surface of the box-like part 61. As a result, rattling of the dust container 7 with respect to the body housing 6 can be suppressed.

In the dust collector 4, when the dust is sucked together with the air, led through the dust transfer passage 80 and collected in the dust container 7, static electricity may be generated and charged on the dust container 7. In the present embodiment, static electricity charged on the dust container 7 can be released from the top surface 725 to the conductive member 67 via the conductive path 68, so that static electricity can be prevented from being charged on the dust container 7.

An overall structure of the sliding part 8 is now briefly explained with reference to FIG. 1. As shown in FIG. 1, the sliding part 8 includes a first transfer part 81 having the suction port 812 and a second transfer part 82 which is connected to the first transfer part 81 and held by the body housing 6.

The first transfer part 81 is a generally L-shaped cylindrical member. A suction hood 811 is provided on one end of the first transfer part 81 and configured to cover a tip end of the tool accessory 19. The suction hood 811 has the suction port 812 through which the tool accessory 19 can be inserted. The end of the first transfer part 81 on which the suction hood 811 is provided and the opposite end are hereinafter referred to as a leading end and a base end, respectively.

The second transfer part 82 is a hollow elongate member which extends straight. The second transfer part 82 is arranged to extend parallel to the hammering axis A1 in the front-rear direction. The base end of the first transfer part 81 is connected to the front end of the second transfer part 82 such that the leading end of the first transfer part 81 faces upward. Part of the second transfer part 82 including a rear end 85 is held by the body housing 6 so as to be slidable in the front-rear direction and arranged within the internal region 60.

Figure 8:
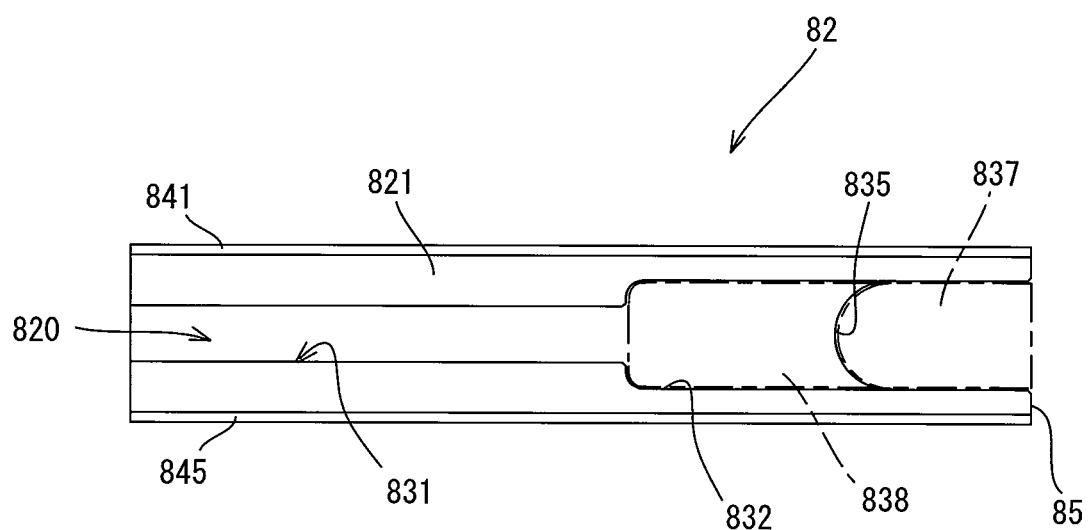
FIG. 8 is a bottom view of a second transfer part.

A structure of the second transfer part 82 is now explained in detail. As shown in FIG. 8, in the present embodiment, an outer shell of the second transfer part 82 is formed by a body flame 821 which is made of aluminum and left and right side parts 841, 845 which are made of resin. The body flame 821 is an elongate member extending straight. Both the left side part 841 and the right side part 845 are also elongate members extending straight. As shown in FIG. 4, the left side part 841 and the right side part 845 are fitted in grooves formed in the left and right sides of the body flame 821 and form the left and right side surfaces of the second transfer part 82. The second transfer part 82 as a whole has a generally rectangular cross-section extending in the left-right direction.

Figure 9:
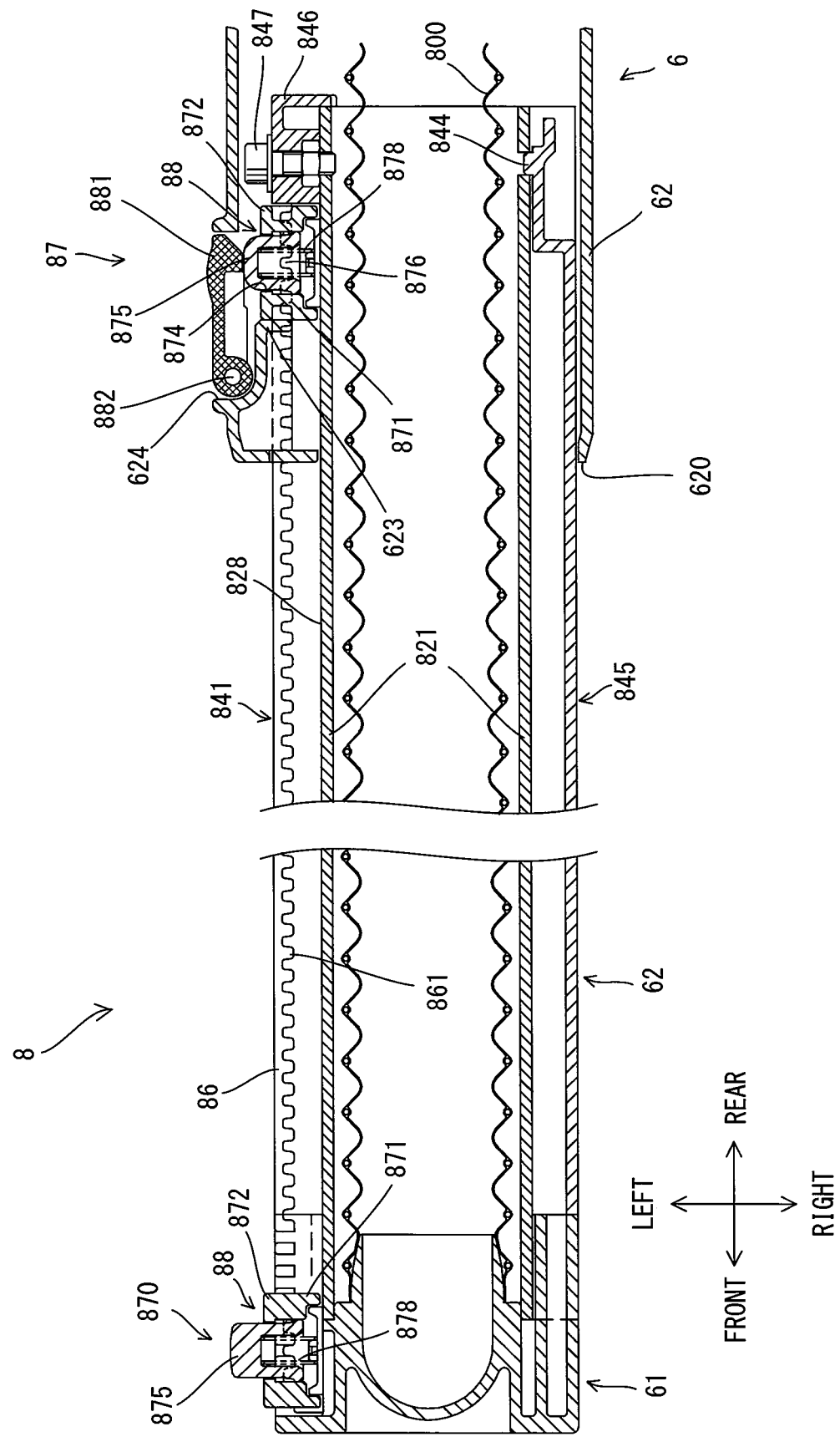
FIG. 9 is a sectional view taken along line IX-IX in FIG. 3.

As shown in FIG. 9, a bolt 847 is inserted through a through hole of a fastening part 846 provided on a rear end of the left side part 841 and a through hole formed in the body flame 821, and fastened with a nut. The left side part 841 is thus fastened to a left rear end part of the body flame 821. Further, an engagement piece 844 formed on a rear end part of the right side part 845 is engaged with an engagement hole formed in the body flame 821. The right side part 845 is thus fastened to a right rear end part of the body flame 821. The left side part 841 is fastened not by an engagement piece but by the bolt 847. This is because load of engagement units 88 of a length adjusting part 87 and a depth adjusting part 870 which are described below is applied to the left side part 841, so that the left side part 841 needs to be more firmly fastened to the body flame 821.

The second transfer part 82 is configured to be slidably engaged with the body housing 6. Specifically, as shown in FIG. 4, a pair of engagement recesses 822 are formed in the left part of the body flame 821. The engagement recesses 822 are spaced apart from each other in the up-down direction and extend in the front-rear direction. A pair of engagement recesses 823 are also similarly formed in the right part of the body flame 821. The engagement recesses 822, 823 are configured to be slidably engaged with the guide rails 621, 622, respectively. With such a structure, the sliding part 8 is held with respect to the body housing 6 so as to be allowed to slide in parallel to the hammering axis A1 in the front-rear direction (i.e. in the longitudinal direction of the second transfer part 82) while being prevented from moving around a longitudinal axis of the second transfer part 82.

In the present embodiment, the sliding part 8 can move with respect to the main body 5 between a farthest position shown by a solid line and a closest position shown by a two-dot chain line in FIG. 1. The farthest position refers to a position of the sliding part 8 in which the suction port 812 is located farthest away from the opening 620 of the body housing 6 in the front-rear direction (i.e. the longitudinal direction of the second transfer part 82, or the sliding direction of the sliding part 8). It can also be said that the farthest position refers to a position of the sliding part 8 in which the length of protrusion of the sliding part 8 from the opening 620 (hereinafter merely referred to as the protrusion length of the sliding part 8) is maximum and the length of insertion of the sliding part 8 into the internal region 60 (hereinafter merely referred to as the insertion length of the sliding part 8) is minimum. The closest position refers to a position of the sliding part 8 in which the suction port 812 is located closest to the opening 620 in the front-rear direction. It can also be said that the closest position refers to a position of the sliding part 8 in which the protrusion length of the sliding part 8 is minimum and the insertion length of the sliding part 8 is maximum.

In the present embodiment, when the sliding part 8 is placed at the farthest position, the rear end 85 of the sliding part 8 is located within the cylindrical part 62. When the sliding part 8 is placed at the closest position, the rear end 85 of the sliding part 8 is located within the rear end part of the box-like part 61 rearward of the communication passage 9 (the communication passage forming part 90). In other words, the distance between the opening 620 and the rear end 85 of the sliding part 8 placed at the closest position (or the maximum insertion length of the sliding part 8 into the internal region 60) is longer than the distance between the opening 620 and the communication passage forming part 90 in the front-rear direction.

The second transfer part 82 (more specifically, the body flame 821) has an internal passage 820 which extends straight in the front-rear direction (the longitudinal direction of the second transfer part 82) through the second transfer part 82 (the body flame 821). The internal passage 820 is configured to allow the dust transfer passage 80 connecting the suction port 812 and the dust container 7 to pass through the internal passage 820. In the present embodiment, the dust transfer passage 80 is defined by the first transfer part 81, the hose 800 and the hose connecting part 802.

As shown in FIG. 1, the base end of the first transfer part 81 is inserted and fixed in the front end part of the internal passage 820. One end (a front end) of the hose 800 is connected to the base end of the first transfer part 81. The hose 800 has a compression coil spring 801 externally fitted thereon so as to be configured to expand and contract. The other end (a rear end) of the hose 800 is connected to one end of the hose connecting part 802. The hose connecting part 802 is formed as an L-shaped cylindrical member as viewed from the side. The other end of the hose connecting part 802 protrudes downward through the through hole 617 (see FIG. 2) formed in a lower surface of a front end part of the box-like part 61. When the dust container 7 is attached to the body housing 6, the other end of the hose connecting part 802 is inserted into the dust container 7 through the inlet 701. Thus, the dust transfer passage 80 which extends through the first transfer part 81, the hose 800 and the hose connecting part 802 communicates with the internal space of the dust container 7. Further, the sliding part 8 is normally biased forward, that is, in a direction in which the sliding part 8 protrudes from the body housing 6 (the opening 620) by the compression coil spring 801 fitted on the hose 800.

The arrangement of the hose 800 and the hose connecting part 802 with respect to the sliding part 8 changes as the sliding part 8 moves with respect to the body housing 6 in the front-rear direction. Specifically, when the sliding part 8 is placed at the farthest position as shown by the solid line in FIG. 1, the rear end 85 of the sliding part 8 is located within the cylindrical part 62. Therefore, the hose 800 extends over an entire length of the internal passage 820 from the front end to the rear end. When the sliding part 8 is placed at the closest position as shown by the two-dot chain line, the rear end 85 of the sliding part 8 is located in the rear end part of the internal region 60 (the box-like part 61). Therefore, the contracted hose 800 is located in the front part of the internal passage 820 and the hose connecting part 802 which is bent downward and connected to the dust container 7 is located in the center of the internal passage 820. Therefore, the second transfer part 82 has a structure for avoiding interference with the dust transfer passage 80. Further, as described above, the communication passage 9 is provided in a central region inside the box-like part 61. Therefore, the second transfer part 82 also has a structure for avoiding interference with the communication passage 9 when the sliding part 8 is placed at the closest position. These structures are now explained.

As shown in FIG. 8, the body flame 821 has a groove 835 formed in its upper part and a groove 831 formed in its lower part.

The groove 835 is formed by cutting out an upper part of the body flame 821 (a part of the body flame 821 above the internal passage 820) in a direction from the rear end 85 of the body flame 821 (or the rear end of the sliding part 8) toward the front so as to have a U-shape in a plan view. A lower end of the groove 835 is contiguous to the internal passage 820. A front end (a part cut out deepest from the rear end 85) of the groove 835 is set to be located forward of the front end of the communication passage forming part 90 when the sliding part 8 is placed at the closest position. In other words, the distance between the front end of the groove 835 and the rear end 85 is longer than the distance between the front end of the communication passage forming part 90 and the rear end 85 when the sliding part 8 is placed at the closest position. Further, the distance between the front end of the groove 835 and the rear end 85 is shorter than the distance between the opening 620 and the rear end 85 when the sliding part 8 is placed at the farthest position.

The groove 831 extends straight from the front end to the rear end of the body flame 821. An upper end of the groove 831 is contiguous to the internal passage 820. A rear part of the groove 831 has a wider width (length in the left-right direction) than a front part of the groove 831. Hereinafter, the rear part of the groove 831 is referred to as a wide part 832. Further, a part of the hose connecting part 802 which extends downward (see FIG. 2) is hereinafter referred to as a downward extending part 803. A front end of the wide part 832 is set to be located forward of a front end of the downward extending part 803 when the sliding part 8 is placed at the closest position. The wide part 832 has substantially the same width (length in the left-right direction) as the above-described groove 835. The widths of the wide part 832 and the groove 835 are set to be larger than at least the outer diameters of the widest parts of the communication passage forming part 90 and the downward extending part 803 in the left-right direction.

With such a structure, in the second transfer part 82, as shown in FIGS. 2 and 8, a first space 837 is formed to extend through the second transfer part 82 in the up-down direction and extend from the front end of the groove 835 to the rear end 85 in the front-rear direction (i.e. the longitudinal direction of the second transfer part 82, or the sliding direction of the sliding part 8). In the present embodiment, the first space 837 may also be referred to as a space region defined by an outline of the groove 835 and the rear end 85 when viewed from the hammer drill 1 side (from above) in the extending direction of the communication passage forming part 90 (the up-down direction), and extending through the second transfer part 82 in the up-down direction and open to the rear end 85. The first space 837 is provided to avoid interference between the sliding part 8 and the communication passage 9 (the communication passage forming part 90) when the sliding part 8 is placed at the closest position. The first space 837 includes at least a region in which the communication passage forming part 90 is disposed when the sliding part 8 is placed at the closest position.

Further, in the second transfer part 82, a second space 838 is formed to extend upward from a lower surface of the second transfer part 82 and extend from the front end of the wide part 832 to the rear end 85 in the front-rear direction (i.e. the longitudinal direction of the second transfer part 82, or the sliding direction of the sliding part 8). The second space 838 may also be referred to as a space region defined by an outline of the wide part 832 and the rear end 85 when viewed from the dust container 7 side (from below) in the extending direction of the communication passage forming part 90 (the up-down direction), and extending from the wide part 832 to the internal passage 820 and open to the rear end 85. The second space 838 is provided to avoid interference between the sliding part 8 and the dust transfer passage 80 (the downward extending part 803) when the sliding part 8 is placed at the closest position. The second space 838 includes at least a region in which the downward extending part 803 is disposed when the sliding part 8 is placed at the closest position. Further, the second space 838 is a space region which partly overlaps the first space 837.

Operations of the first space 837 and the second space 838 are now explained. When the sliding part 8 moves rearward with respect to the body housing 6 from the farthest position to the closest position, the rear end 85 of the sliding part 8 moves from the position shown by the solid line in FIG. 2 to the position shown by the two-dot chain line in FIG. 2. In this process, when the rear end 85 reaches the front end of the downward extending part 803, the downward extending part 803 enters the second space 838 from the rear end 85 side. Therefore, the sliding part 8 can further move rearward without interfering with the downward extending part 803. Further, when the rear end 85 reaches the front end of the communication passage forming part 90, the communication passage forming part 90 enters the first space 837 from the rear end 85 side. Therefore, the sliding part 8 can further move rearward without interfering with the communication passage forming part 90. When the sliding part 8 is placed at the closest position, the downward extending part 803 and the communication passage forming part 90 are respectively disposed in the front end parts of the second space 838 and the first space 837. In this manner, by the presence of the first space 837 and the second space 838, even when the sliding part 8 is placed at the closest position, interference between the sliding part 8 and the dust transfer passage 80 and interference between the sliding part 8 and the communication passage 9 can be avoided.

The length adjusting part 87 and the depth adjusting part 870 are now explained with reference to FIGS. 3, 9 and 10. The length adjusting part 87 is configured to adjust the protrusion length of the sliding part 8 at the start of the processing operation. The depth adjusting part 870 is configured to adjust the depth of a workpiece to be processed by the tool accessory 19.

Both the length adjusting part 87 and the depth adjusting part 870 are held by a pair of guide rails 86 so as to be movable in the longitudinal direction of the sliding part 8 (i.e. in the front-rear direction) with respect to the sliding part 8, and configured to engage with the pair of guide rails 86. As shown in FIG. 3, the guide rails 86 are provided on the left side part 841. The guide rails 86 are spaced apart from each other in the up-down direction and extend generally in parallel to each other in the front-rear direction. As shown in FIG. 9, a clearance is provided between the guide rails 86 and a left side surface 828 of the body flame 821 in the left-right direction. Each of the guide rails 86 has a tooth part 861. The tooth part 861 includes a plurality of projections which are arranged at equal intervals in a row in the front-rear direction. Engagement parts 876 of the length adjusting part 87 and the depth adjusting part 870 can be engaged with the tooth part 861.

In the present embodiment, the length adjusting part 87 includes substantially the same structure as the depth adjusting part 870 and an additional structure. Specifically, both the length adjusting part 87 and the depth adjusting part 870 include the engagement unit 88 including a holding member 871, a pressing member 875 and a biasing spring 878. The length adjusting part 87 further includes an operating lever 881. First, the engagement unit 88 (the holding member 871, the pressing member 875 and the biasing spring 878) which is common to the length adjusting part 87 and the depth adjusting part 870 is now explained. Although, in the following description, the engagement unit 88 of the length adjusting part 87 is referred to, the engagement unit 88 of the depth adjusting part 870 has substantially the same structure as the engagement unit 88 of the length adjusting part 87 except that the shape is slightly different.

Figure 10:
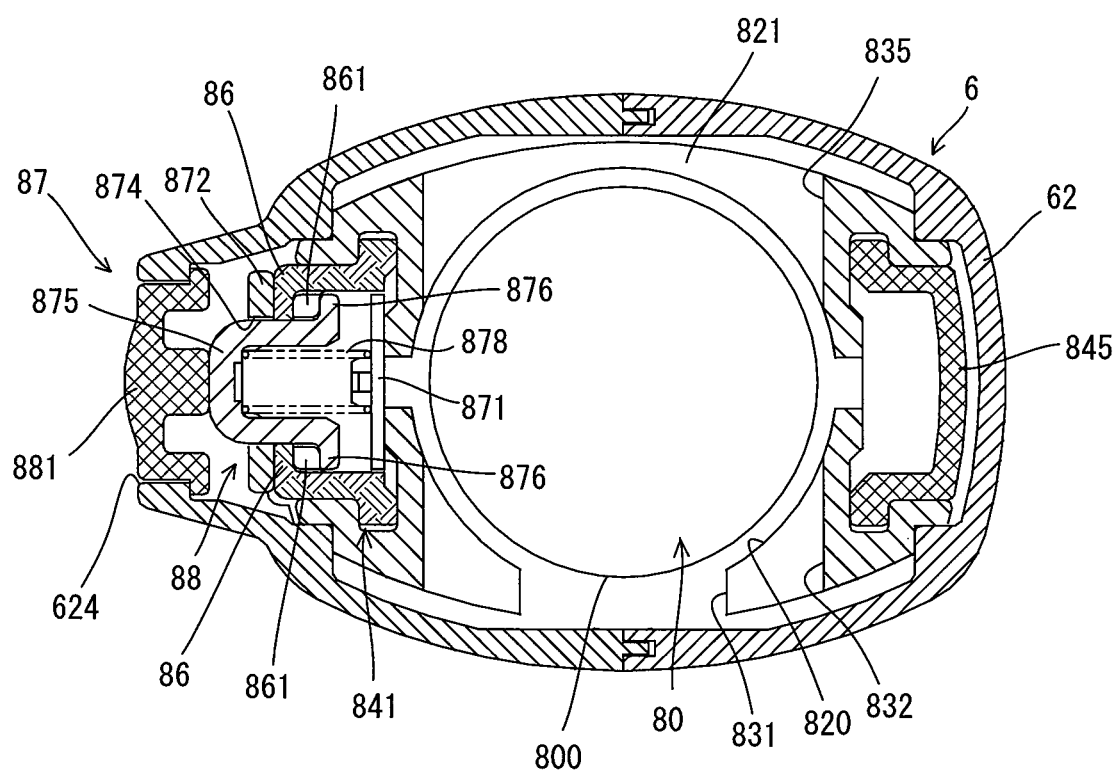
FIG. 10 is a sectional view taken along line X-X in FIG. 1.

As shown in FIGS. 3, 9 and 10, the holding member 871 is held movably in the front-rear direction with respect to the sliding part 8 by the pair of guide rails 86. More specifically, a left side surface part 872 of the holding member 871 which is rectangular as viewed from the side is disposed on the left side of the guide rails 86 in such a manner as to be placed over the upper and lower guide rails 86. The other parts of the holding member 871 are disposed between the guide rails 86 and the left side surface 828 of the body flame 821. The pressing member 875 is held slidably in the left-right direction by the holding member 871 while being biased leftward by the biasing spring 878. A body part of the pressing member 875 is disposed between the guide rails 86 in the up-down direction, and a tip end (left end) of the pressing member 875 normally protrudes leftward through an opening 874 provided in the holding member 871. Further, engagement parts 876 are formed on upper and lower right ends of the pressing member 875. The engagement parts 876 are configured to engage with the tooth parts 861 of the guide rails 86. The pressing member 875 is normally biased leftward by a biasing force of the biasing spring 878, so that the engagement parts 876 are engaged with the tooth parts 861. Thus, the engagement unit 88 is positioned in the longitudinal direction of the second transfer part 82 (i.e. in the front-rear direction).

When the user presses the pressing member 875 rightward (toward the inside of the second transfer part 82), the pressing member 875 moves rightward against the biasing force of the biasing spring 878 and then the engagement part 876 is disengaged from the tooth part 861. Then the user can engage the engagement part 876 with the tooth part 861 at a different position by moving the engagement unit 88 along the guide rails 86 and then releasing the pressing member 875. In this manner, the user can change the position of the engagement unit 88 in the longitudinal direction of the second transfer part 82 (the front-rear direction).

The engagement unit 88 which forms the depth adjusting part 870 can be placed at any position on a part of the guide rails 86 which are exposed to the outside from the body housing 6 (that is, the part which protrudes forward through the opening 620). On the other hand, the engagement unit 88 of the length adjusting part 87 is disposed inside the body housing 6 and is not exposed to the outside. Specifically, as shown in FIG. 9, a movement preventing part 623 is provided inside a left side part of the cylindrical part 62 and protrudes rightward. As described above, the sliding part 8 is biased forward by the compression coil spring 801 fitted on the hose 800. Therefore, the engagement unit 88 engaged with the guide rails 86 inside the body housing 6 is moved forward together with the sliding part 8 and made into contact with the movement preventing part 623, and thus prevented from further moving forward. In other words, in the front-rear direction, the engagement unit 88 of the length adjusting part 87 is normally held in a position (hereinafter referred to as an initial position) in which the engagement unit 88 of the length adjusting part 87 is in contact with the movement preventing part 623 from the rear by the biasing force of the compression coil spring 801.

An opening 624 is formed in the left side part of the cylindrical part 62 at a position facing the engagement unit 88 located at the initial position. The operating lever 881 is arranged to cover the opening 624 and is held by the cylindrical part 62 so as to be rotatable in the left-right direction via a pin 882. When the operating lever 881 is pressed rightward from outside, the pressing member 875 is pressed rightward by a rear end part of the operating lever 881. Thus, the engagement part 876 is disengaged from the tooth part 861.

An operation of adjusting the protrusion length with the length adjusting part 87 may be performed as follows. In order to adjust the protrusion length of the sliding part 8, the user may move the sliding part 8 in the front-rear direction with respect to the body housing 6 with one hand in such a manner that the front end of the tool accessory 19 is covered by the suction hood 811, while pressing the operating lever 881 of the length adjusting part 87 with the other hand. At this time, the engagement unit 88 is held between the operating lever 881 and the body flame 821 while the engagement unit 88 is disengaged from the guide rails 86, so that the sliding part 8 also moves in the front-rear direction with respect to the engagement unit 88. When the user releases the operating lever 881, the engagement unit 88 is engaged with the guide rails 86 again and the engagement unit 88 is placed at the initial position. In this manner, the protrusion length of the sliding part 8 is determined. Further, the fastening part 846 provided on the rear end of the left side part 841 serves as a stopper for the sliding part 8 by contact with a rear end of the engagement unit 88 of the length adjusting part 87 and defines the farthest position of the sliding part 8.

In the present embodiment, the second transfer part 82 is configured such that the groove 835 formed in the upper part of the body flame 821 is located inside the cylindrical part 62 when the sliding part 8 is placed at the farthest position. In other words, the first space 837 is located inside the cylindrical part 62 when the sliding part 8 is placed at the farthest position.

An operation of adjusting the depth of the workpiece to be processed with the depth adjusting part 870 may be performed as follows. When the processing operation proceeds with the suction hood 811 pressed against the workpiece, the sliding part 8 is pushed into the body housing 6 against the biasing force of the compression coil spring 801. The engagement unit 88 moves together with the sliding part 8 while being engaged with the guide rails 86. In this process, when the left side surface part 872 of the depth adjusting part 870 comes in contact with the front end (the opening 620)

of the cylindrical part 62, the sliding part 8 is prevented from further moving rearward with respect to the body housing 6. In other words, the depth of the workpiece to be processed corresponds to the distance from the opening 620 to the rear end of the left side surface part 872. Therefore, the user simply needs to adjust the position of the engagement unit 88 on the guide rails 86 in the above-described manner according to a desired depth to be processed. When the engagement unit 88 of the depth adjusting part 870 is placed at the front end of the guide rails 86, the sliding part 8 can be moved up to the closest position with respect to the body housing 6.

As described above, in the dust collector 4 of the present embodiment, when the sliding part 8 is placed at the closest position, that is, when the sliding part 8 enters most deeply into the main body 5 (the body housing 6), the rear end 85 of the sliding part 8 is located farther away from the opening 620 than the communication passage 9 (the communication passage forming part 90) in the internal region 60. By providing the first space 837 in the sliding part 8, interference of the sliding part 8 with the communication passage 9 can be avoided even when the sliding part 8 is placed at the closest position. Therefore, compared with a known structure in which the length of the sliding part 8 is set such that the sliding part 8 does not reach the communication passage 9 when the sliding part 8 is placed at the closest position, the dust collector 4 is realized which can be used with a longer tool accessory 19.

The first space 837 is formed as a space region in the sliding part 8 which extends through the sliding part 8 in the up-down direction crossing the sliding direction (the front-rear direction) of the sliding part 8 and extends continuously to the rear end 85 in the front-rear direction. Further, the first space 837 includes at least a region in which the communication passage 9 is disposed when the sliding part 8 is placed at the closest position. In this manner, a structure for avoiding interference with the communication passage 9 is provided in the form of the first space 837 formed in the sliding part 8, so that the sliding part 8 can be formed with a simpler structure as a whole, compared with a case in which such a structure is provided by any member.

The first space 837 is located in the internal region 60 when the sliding part 8 is placed at the farthest position. Therefore, dust can be prevented from entering the sliding part 8 and the main body 5 via the first space 837.

In the present embodiment, there is provided the second space 838 which partly overlaps the first space 837 and extends forward of the first space 837. An upper part of the second space 838 is closed by the body flame 821 in a region forward of the groove 835, so that an upper end of the second space 838 is located in the internal region 60 when the sliding part 8 is placed at the farthest position. As a result, the risk of entry of the dust through the upper end of the second space 838 is also reduced.

In the present embodiment, the main body 5 includes the engagement part 63 and the operation member 64. The engagement part 63 can be slidably engaged with the guide rails 17 of the hammer drill 1. The operation member 64 can switch between a state of maintaining the engagement by the engagement part 63 and a state of allowing disengagement in response to a user's manual operation. Both the engagement part 63 and the operation member 64 are provided on the upper side of the main body 5 facing the hammer drill 1, which facilitates attaching/detaching operation. When attaching and detaching the dust collector 4 to and from the hammer drill 1, it is likely for the user to put his or her thumb on the upper side of the dust collector 4. The operation member 64 is configured to be operated by pressing downward, which further facilitates the operation of the operation member 64.

In the present embodiment, the sliding part 8 has the pair of guide rails 86 and the engagement units 88. The guide rails 86 are arranged substantially in parallel and spaced apart from each other and extend in the front-rear direction. The engagement units 88 are held by the guide rails 86 so as to be movable in the front-rear direction with respect to the sliding part 8 and configured to engage with the guide rails 86. The engagement units 88 respectively form the length adjusting part 87 for adjusting the protrusion length of the sliding part 8 corresponding to the length of the tool accessory 19 to be actually used, and the depth adjusting part 870 for adjusting the insertion length of the sliding part 8 corresponding to a desired depth of a workpiece to be processed by the tool accessory 19. Further, the engagement units 88 are held by the guide rails 86 and thus can stably move along the guide rails 86 in the front-rear direction.

The dust collector 4 of the present embodiment is configured to collect the dust utilizing the air flow generated by the dust collecting fan 25 of the hammer drill 1, so that the dust collector 4 does not have any electric component including a metal region (such as a motor and a fan for dust collection). Instead, the dust collector 4 needs to have the communication passage 9 for providing communication between the dust container 7 for storing the dust and the air passage 151 of the hammer drill 1. Therefore, the internal region 60 which is arranged between the hammer drill 1 and the dust container 7 when the dust container 7 is attached to the hammer drill 1 is provided in the main body 5. The communication passage 9 is provided in the internal region 60. In the present embodiment, the conductive member 67 is also provided in the internal region 60 and connected to the dust container 7 via the conductive path 68. Thus, static electricity generated in the process of collecting the dust can be released from the dust container 7 to the conductive member 67 while a dead space within the internal region 60 is effectively utilized. Thus, static electricity is effectively prevented from being charged on the dust container 7.

In a structure like the present embodiment in which the sliding part 8 moves within the internal region 60, a relatively large dead space is formed in the internal region 60 in order to secure a space for such movement. Therefore, in the dust collector 4 which is configured such that the sliding part 8 moves with respect to the main body 5 within the internal region 60, a larger dead space can be utilized by providing the conductive member 67 in the internal region 60.

The dust container 7 is configured to be removably attached to the internal region 60 (the body housing 6) and has the top surface 725 formed of a conductive material. The conductive path 68 is formed of conductive rubber and configured to electrically connect the top surface 725 and the conductive member 67 when the dust container 7 is attached to the body housing 6. This structure facilitates disposal of the dust and eliminates the need for separately connecting the top surface 725 and the conductive member 67 when attaching the dust container 7 to the body housing 6. Further, the conductive path 68 is configured to buffer mutual contact between the dust container 7 and the body housing 6 via the second end 682. As a result, rattling of the dust container 7 with respect to the body housing 6 is suppressed.

Second Embodiment

Figure 11:
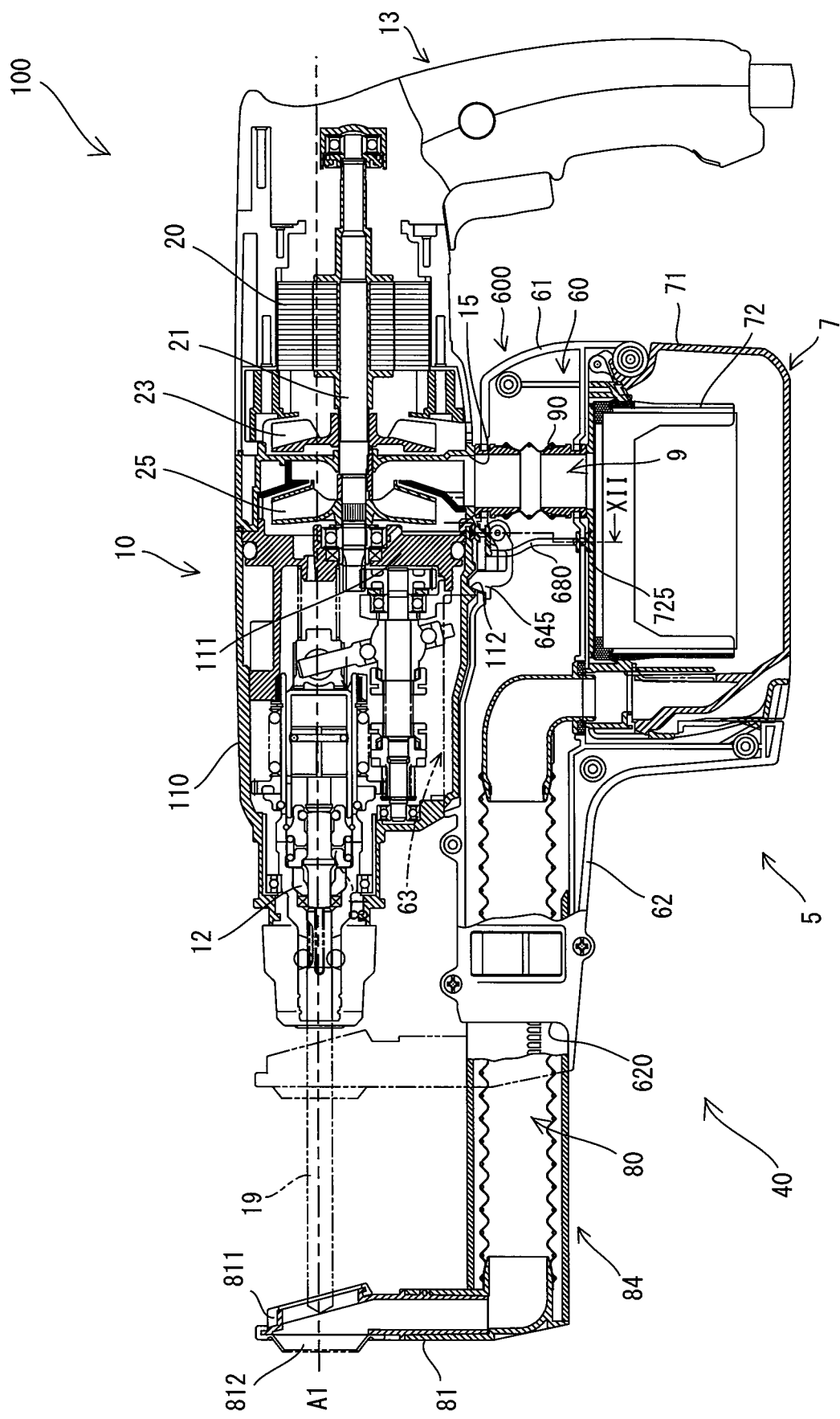
FIG. 11 is a longitudinal sectional view showing a hammer drill to which a dust collector according to a second embodiment is attached.
Figure 12:
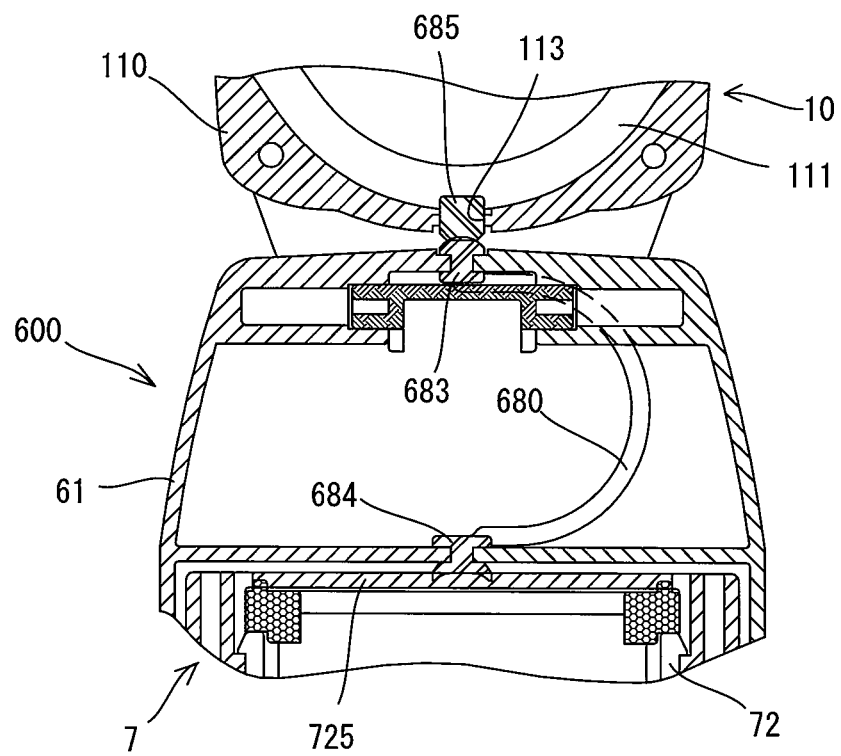
FIG. 12 is a sectional view taken along line XII-XII in FIG. 11.

A hammer drill 100 and a dust collector 40 according to a second embodiment are now explained with reference to FIGS. 11 and 12. Most of the structure of the hammer drill 100 of the second embodiment is identical to the hammer drill 1 of the first embodiment. Further, main parts of the structure of the dust collector 40 is identical to the dust collector 4 of the first embodiment. Therefore, in the following description, components or structures which are substantially identical to those in the first embodiment are given the same numerals and are not described or only briefly described, and differences from the first embodiment are mainly described.

First, a structure of removably attaching the dust collector 40 to the hammer drill 100 is explained. Like in the first embodiment, the guide rails 17 are provided on a front part of a lower end part of a body housing 110 of the hammer drill 100. Further, the engagement part 63 having the guide grooves 631 is provided on an upper end of a body housing 600 of the dust collector 40 (see FIGS. 2 and 4). Further, as shown in FIGS. 11 and 12, an engagement recess 112 and a projection 645 are provided as a structure for preventing the body housing 11 and the body housing 6 from moving with respect to each other in the front-rear direction while the engagement part 63 and the guide rails 17 are engaged with each other, but this structure is slightly different from that of the first embodiment.

Specifically, the engagement recess 112 of the hammer drill 100 is provided not in the lower front end part of the body housing 110, but in front of the intake port 15 in the center of the lower end part. The projection 645 which can engage with the engagement recess 112 is arranged in front of the communication passage forming part 90 in the internal region 60 of the body housing 600. When the dust collector 40 is moved rearward with respect to the hammer drill 100 and reaches a specified position while the engagement part 63 and the guide rails 17 are engaged with each other, the projection 645 engages with the engagement recess 112. Further, although not shown, an operating member for moving the projection 645 in the up-down direction is arranged to be exposed to the left side of the body housing 600.

The structure of the dust collector 40 is now explained. The dust collector 40 includes the main body 5 having the body housing 600 and the dust container 7, and a sliding part 84. The body housing 600 has substantially the same structure as the body housing 6 of the first embodiment, but in the internal region 60, the body housing 600 has the above-described projection 645 and a different structure from that of the first embodiment for preventing static electricity from being charged on the dust container 7. Specifically, the dust collector 40 has a first conductive path 680 for releasing static electricity charged on the dust container 7 to the hammer drill 100.

The first conductive path 680 is formed of conductive rubber like the conductive path 68 of the first embodiment. The first conductive path 680 is generally shaped like a cord. Both ends of the first conductive path 680, that is, a first end 683 and a second end 684, are respectively fitted in through holes formed in the upper and lower surfaces of the box-like part 61. Part of the first end 683 slightly protrudes upward from the upper surface of the box-like part 61. Part of the second end 684 slightly protrudes downward from the lower surface of the box-like part 61. When the dust container 7 is attached to the body housing 6, part of the second end 684 is pressed into close contact with the top surface 725 of the filter holder 72 from above.

A through hole 113 is formed in the lower end part of the body housing 110 of the hammer drill 100 at a position facing the first end 683 when the dust collector 40 is attached to the hammer drill 100. The through hole 113 is provided in front of the intake port 15 and behind a support 111 in the front-rear direction. The support 111 is a metal member provided within the body housing 110 and configured to support part of internal mechanisms of the main body 10. In the present embodiment, the support 111 supports a front one of two bearings which are fitted onto the front and rear ends of the output shaft 21. The second conductive path 685 formed of conductive rubber is fitted in the through hole 113 with its upper and lower ends respectively protruding upward and downward through the through hole 113. The upper end of the second conductive path 685 protruding into the body housing 110 is held in close contact with a rear surface of the support 111 from the rear.

When the dust collector 40 is attached to the hammer drill 100, the first end 683 of the first conductive path 680 of the dust collector 40 is pressed into close contact with the second conductive path 685 from below. As a result, the top surface 725 of the dust container 7 which is formed of conductive material and the metal support 111 are electrically connected to each other via the first and second conductive paths 680, 685. Therefore, when static electricity is charged on the dust container 7, the static electricity is released from the top surface 725 to the support 111 via the first and second conductive paths 680, 685. Thus, static electricity is prevented from being charged on the dust container 7.

Further, in the dust collector 40 of the present embodiment, the length of the sliding part 84 in the longitudinal direction (the front-rear direction) is set to be shorter than that of the sliding part 8 of the dust collector 4 of the first embodiment. Specifically, when the sliding part 84 is placed at the closest position, although not shown, the rear end of the sliding part 84 is located forward of the communication passage 9 (the communication passage forming part 90) and rearward of the hose connecting part 802. Therefore, like in the first embodiment, the sliding part 84 has a structure (groove 831) for avoiding interference with the hose connecting part 802, but unlike in the first embodiment, a structure for avoiding interference with the communication passage 9 is not particularly provided.

In the dust collector 40, a structure (a guide rail, an engagement unit, an operating lever) for adjusting a protrusion length of the sliding part 84 is different from that in the first embodiment, but its description is omitted here.

Correspondences between the features of the embodiments and the features of the invention are as follows:

The dust collector 4 is a structural example that corresponds to the "dust collector" according to the present invention. The main body 5 and the sliding part 8 are structural examples that correspond to the "main body" and the "sliding part", respectively, according to the present invention. The internal region 60, the dust container 7 and the opening 620 are structural examples that correspond to the "internal region", the "dust storing region" and the "opening", respectively, according to the present invention. The suction port 812 and the dust transfer passage 80 are structural examples that correspond to the "suction port" and the "dust transfer passage", respectively, according to the present invention. The communication passage 9 is a structural example that corresponds to the "communication passage" according to the present invention. The rear end 85 of the sliding part 8 is a structural example that corresponds to the "innermost end" according to the present invention. The first space 837 is a structural example that corresponds to the "interference avoiding part" and the "space" according to the present invention. The engagement part 63 and the operation member 64 are structural examples that correspond to the "engagement part" and the "operation member", respectively, according to the present invention. The pair of guide rails 86 and the engagement unit 88 are structural examples that correspond to the "pair of guide rails" and the "positioning member", respectively, according to the present invention. The hammer drill 1, the body housing 11 and the dust collecting fan 25 are structural examples that correspond to the "power tool", the "tool body" and the "fan", respectively, according to the present invention.

The above-described embodiments are merely representative examples, and a dust collector and a power tool according to the present invention are not limited to the above-described structures of the dust collector 4, 40 and the hammer drill 1, 100. For example, following modifications or changes may be made. Further, one or more of these modifications or changes may be employed in combination with the dust collector 4, 40 and the hammer drill 1, 100 which are shown in the embodiments, or with the claimed invention.

The dust collector 4, 40 may be applied to a power tool other than the hammer drill 1, 100. Specifically, the dust collector 4, 40 may be applied to a power tool in which it is preferable to adjust the protrusion length of the sliding part 8, 84 according to the length of the tool accessory 19. Such a power tool includes a power tool that is configured to perform drilling operation (such as a vibration drill and an electric drill).

An engagement mechanism between the dust collector 4, 40 and the hammer drill 1, 100 or another power tool is not limited to a combination of the guide rails 17 and the engagement part 63 shown in the above-described embodiments. An engagement mechanism formed, for example, by a combination of a hook and an engagement hole may be employed. Further, in view of enhancing operability, like the operation member 64 of the first embodiment, it is preferred that a member for switching a state of maintaining engagement between the dust collector 4, 40 and the hammer drill 1, 100 or another power tool and a state of allowing release of the engagement is provided on the same side as the engagement mechanism. In the first embodiment, the operation member 64 is arranged on the upper front end part of the main body 5 so as to correspond to the lower front end part of the hammer drill 1, but it may be arranged on the upper rear end part of the main body 5 so as to correspond to the lower rear end part of the hammer drill 1.

The attaching/detaching structure in the dust collector 4, 40 need not necessarily be provided in the main body 5, and it may be provided in other part or provided separately from the dust collector 4, 40. For example, the dust collector 4, 40 may be attached to the tool body of the hammer drill 1, 100 or another power tool with a belt having a fastener or with an annular member formed of flexible material such as rubber.

In the above-described embodiment, the dust transfer passage 80 is defined by the first transfer part 81, the hose 800 and the hose connecting part 802. However, the dust transfer passage 80 only needs to be configured to transfer dust together with air from the suction port 812 to the dust container 7. For example, the dust transfer passage 80 may be defined only by a hose which connects the suction port 812 and the dust container 7. The dust container 7 is not limited to the structure which is removably attached to the body housing 6, and it may be integrally formed with the body housing 6. Further, the structure of the dust container 7 may be appropriately changed or modified, provided that the dust container 7 is configured to separate dust transferred through the dust transfer passage 80 from air and collect the dust.

The shape and arrangement of the communication passage 9 in the internal region 60 may be appropriately changed or modified according to the arrangement of the outlet 702 of the dust container 7 and the intake port 15 of the hammer drill 1. For example, the communication passage 9 may extend obliquely with respect to the up-down direction or may be at least partly curved. The structure for avoiding interference with the communication passage 9 (the communication passage forming part 90) in the sliding part 8 is not limited to the first space 837 and may be appropriately changed or modified. It is only necessary for the first space 837 to include at least a region in which the communication passage 9 (the communication passage forming part 90) is disposed when the sliding part 8 is placed at the closest position, and to extend through the second transfer part 82 in the up-down direction and to be open to the rear end 85. As long as these conditions are met, for example, the shape or arrangement of the groove 835 and the wide part 832 of the groove 831 which define the first space 837 may be changed or modified.

In order to reduce the risk of entry of dust into the sliding part 8 and the main body 5, it is preferred that at least the upper end part of the first space 837 is located within the internal region 60, that is, within the body housing 6, when the sliding part 8 is placed at the farthest position. This limitation does not exclude that the first space 837 is exposed to the outside of the body housing 6 when the sliding part 8 is placed at the farthest position. Therefore, the first space 837 may be formed, for example, to extend over the entire length of the body flame 821 in the front-rear direction and extend through the body flame 821 in the up-down direction. Specifically, for example, the second transfer part 82 may be formed by a pair of right and left elongate members which extend in the front-rear direction and have a structure for slidably engaging with the body housing 6, and a connecting member for appropriately connecting these members.

Only either one of the length adjusting part 87 and the depth adjusting part 870 of the dust collector 4 may be provided, or both of them may be omitted. Further, the structures of the guide rails 86, the engagement unit 88 and the operating lever 881 may be appropriately changed or modified. For example, the engagement unit 88 may be configured to move along one guide rail and engage with the guide rail, in place of the pair of guide rails 86.

In view of preventing static electricity from being charged on the dust container 7, it is preferred that the dust container 7 is electrically connected to a place (the conductive member 67, the support 111 of the hammer drill 100) to release static electricity via a conductive path (the conductive path 68, the first and second conductive paths 680, 685). However, such a structure need not necessarily be provided. Further, the shapes of the conductive member 67 and the conductive path 68 of the dust collector 4 and their arrangement in the internal region 60 may be appropriately changed or modified. For example, the conductive member 67 may be connected to the dust container 7 not via the one conductive path 68 but via a plurality of conductive paths. In place of the conductive member 67 and the conductive path 68, the first and second conductive paths 680, 685 of the second embodiment may be provided in the hammer drill 1 and the dust collector 4. A metal motor 20 housing may be used in place of the support 111 as a place to release static electricity in the hammer drill 100. The conductive member 67 and the conductive path 68 of the first embodiment may be provided in the dust collector 40 in place of the first conductive path 680. The top surface 725, the conductive member 67, the conductive path 68 and the first and second conductive paths 680, 685 may be formed of conductive materials other than the materials shown in the above-described embodiments.

A part of the dust container 7 which is formed of a conductive material is not limited to the top surface 725, but it may be a different part (for example, the flame 721). Further, the dust container 7 need not necessarily have a part formed of a conductive material. In this case, a structure of releasing static electricity from the dust container 7 to the support 111 or the conductive member 67 may be realized, for example, by arranging part of the conductive path 68 or first conductive path 680 within the dust container 7.

In a structure like the above-described embodiments in which the dust transfer passage 80 includes a part extending in a direction (specifically a downward direction toward the dust container 7) crossing the sliding direction of the sliding part 8 (the front-rear direction), it is preferred that the sliding part 8 includes a structure for avoiding interference with the dust transfer passage 80 in addition to the communication passage 9 (the communication passage forming part 90). From this viewpoint, the following aspects are provided. Further, any one or more of the aspects may be employed in combination with the claimed invention.

Aspect 1

The dust transfer passage may include a first part that extends in the first direction within the sliding part and a second part that extends in the second direction and connects the first part and the dust storing region. The second part may be disposed between the communication passage and the opening in the first direction, and the sliding part may include a transfer passage interference avoiding part that is configured to avoid interference with the second part when the sliding part is placed at the closest position.

Aspect 2

In Aspect 1, the transfer passage interference avoiding part may be configured as a space formed in the sliding part, extending from the dust storing region side toward the power tool side in the second direction and extending continuously up to the innermost end in the first direction. Further, the transfer passage interference avoiding part may include at least a region in which the second part is disposed when the sliding part is placed at the closest position.

Further, in order to provide a technique for preventing static electricity from being charged on a dust storing region, in a dust collector which is configured to suck dust by utilizing an air flow generated by a power tool, Aspects 3 to 5 are provided below. Any one or more of the aspects may be employed alone, as well as in combination with the dust collector 4, 40 and the hammer drill 1, 100 which are described in the embodiments and in the modifications, Aspects 1 and 2, and with the claimed invention.

Aspect 3

A dust collector configured to be removably attached to a power tool for performing a processing operation on a workpiece by driving a tool accessory and to collect dust generated during the operation by utilizing an air flow generated by the power tool, the dust collector comprising:

a main body configured to be removably attached to the power tool, the main body including a dust storing region and an internal region, the dust storing region being configured to store the dust, the internal region being disposed between the power tool and the dust storing region when the dust collector is attached to the power tool, a dust transfer passage connecting a suction port for the dust and the dust storing region and allowing the dust to be transferred therethrough, a communication passage disposed in the internal region and configured to provide communication between the dust storing region and a passage of the air flow formed in the power tool, when the dust collector is attached to the power tool, and a conductive member disposed in the internal region and connected to the dust storing region via a conductive path.

A typical example of the conductive member may be a metal member. Other examples of the conductive member may be members formed of conductive resin or conductive rubber. The conductive resin refers to resin which is imparted with conductivity by a process such as a process of filling carbon black or metal powder and a process of forming a metallized film on the surface. The conductive rubber refers to rubber which is imparted with conductivity by mixing with carbon black or metal powder. Further, like the conductive member, the conductive path may be formed of conductive material (such as metal, conductive resin and conductive rubber). It is preferable that part of the dust storing region which is connected to the conductive path is conductive.

In the dust collector which collects dust by utilizing an air flow generated by the power tool, it is necessary to provide a conductive path which provides communication between the dust storing region for storing the dust and the air flow passage of the power tool. Accordingly, the internal region is provided in the body to be arranged between the power tool and the dust storing region when the dust collector is attached to the power tool, and the conductive path is provided in the internal region. Generally, an electric component having a metal region is not provided in a dust collector of this type. By providing the conductive member in the same internal region as the communication passage and connecting the conductive member to the dust storing region via the conductive path, static electricity generated in the process of collecting the dust can be released from the dust storing region to the conductive member, while a dead space of the internal region is effectively utilized. Thus, static electricity is effectively prevented from being charged on the dust storing region.

Aspect 4

In Aspect 3, the dust storing region may be configured as a container configured to be removably attached to the internal region, and the dust storing region may include a conductive part formed of a conductive material. The conductive path may be formed of conductive rubber and configured to electrically connect the conductive part and the conductive member and to buffer contact between the container and the main body, when the container is attached to the main body.

Aspect 5

A power tool configured to perform a processing operation on a workpiece by driving a tool accessory, the power tool comprising:

a fan configured to generate an air flow for sucking dust generated during the operation, and a dust collector as defined in Aspect 3 or 4 removably attached to the tool body.

DESCRIPTION OF THE NUMERALS 1, 100: hammer drill
10: main body
11, 110: body housing
12: tool holder
111: support
113: through hole
13: handle
131: handle housing
133: power cable
135: trigger
15: intake port
151: air passage
17: guide rail
18, 112: engagement recess
19: tool accessory
20: motor
21: output shaft
23: cooling fan
25: dust collecting fan
27: driving gear
31: motion converting mechanism
33: striking mechanism
35: rotation transmitting mechanism
4, 40: dust collector
5: main body
6, 600: body housing
60: internal region
61: box-like part
611: protrusion
612: rotary support part
613: engagement part
615, 616, 617, 618: through hole
62: cylindrical part
620: opening
621, 622: guide rail
623: movement preventing part
624: opening
63: engagement part
631: guide groove
64: operation member
640: storing part
641: biasing spring
642: pressing part
643, 645: projection
67: conductive member
68: conductive path
680: first conductive path
681, 683: first end
682, 684: second end
685: second conductive path
7: dust container
701: inlet
702: outlet
71: container body
712: rotary engagement part
713: engagement protrusion
72: filter holder
721: flame
722: side surface
723: rib
725: top surface
73: filter
75: connecting pin
8, 84: sliding part
80: dust transfer passage
800: hose
801: compression coil spring
802: hose connecting part
803: downward extending part
81: first transfer part
811: suction hood
812: suction port
82: second transfer part
820: internal passage
821: body flame
822, 823: engagement recess
828: left side surface
831: groove
832: large width part
835: groove
837: first space
838: second space
841: left side part
844: engagement piece
845: right side part
846: fastening part
847: bolt
85: rear end
86: guide rail
861: tooth part
87: length adjusting part
870: depth adjusting part
88: engagement unit
871: holding member
872: left side surface part
874: opening
875: pressing member
876: engagement part
878: biasing spring
881: operating lever
882: pin
9: communication passage
90: communication passage forming part
A1: hammering axis

What is claimed is:

1. A dust collector configured to be removably attached to a power tool for performing a processing operation on a workpiece by driving a tool accessory and to collect dust generated during the processing operation by utilizing an air flow generated by the power tool, the dust collector comprising:

a main body configured to be removably attached to the power tool, the main body including a dust storing region, an internal region, and an opening, the dust storing region being configured to store the dust, the internal region being disposed between the power tool and the dust storing region when the dust collector is attached to the power tool, and the opening providing communication between the internal region and outside of the main body, a sliding part having an elongate shape and held by the main body so as to be slidable in a specified first direction while partly protruding out of the main body through the opening and partly disposed in the internal region, the sliding part having a suction port for the dust and at least part of a dust transfer passage, the dust transfer passage connecting the suction port and the dust storing region and allowing the dust to be transferred therethrough, and a tubular member extending in a second direction crossing the first direction within the internal region and having two opposite ends respectively connected to an outlet of the dust storing region and an inlet of a passage for the air flow formed in the power tool, when the dust collector is attached to the power tool, the tubular member defining a communication passage between the dust storing region and the passage of the power tool, wherein:

the sliding part is movable with respect to the main body in the first direction between a farthest position and a closest position, the farthest position being a position in which the suction port is located farthest away from the opening, and the closest position being a position in which the suction port is located closest to the opening, when the sliding part is placed at the closest position, a distance in the first direction between the opening and an innermost end of the sliding part is longer than a distance in the first direction between the opening and a portion of the tubular member that extends in the second direction and crosses the first direction within the internal region, the innermost end being an end of the sliding part located at an innermost position in the main body with respect to the opening, and the sliding part includes an interference avoiding part configured to avoid interference with the tubular member when the sliding part is placed at the closest position.

2. The dust collector as defined in claim 1, wherein:

the interference avoiding part is configured as a space formed in the sliding part, the space extending through the sliding part in the second direction and extending continuously up to the innermost end in the first direction, and when the sliding part is placed at the closest position, the communication passage is disposed in at least a region of the space.

3. The dust collector as defined in claim 2, wherein the space is configured such that at least one end of the space in the second direction is located in the internal region when the sliding part is placed at the farthest position, the one end of the space being disposed on the power tool side in the second direction when the dust collector is attached to the power tool.

4. The dust collector as defined in claim 1, wherein the main body includes:

an engagement part provided on a power tool side of the main body, the power tool side facing the power tool in the second direction when the dust collector is attached to the power tool, the engagement part being configured to be removably engaged with a tool body of the power tool; and an operation member provided on the same side as the engagement part in the second direction and configured to switch between a first state and a second state in response to an external manual operation, the first state maintaining engagement between the tool body and the engagement part and the second state allowing release of the engagement.

5. The dust collector as defined in claim 4, wherein the operation member is configured to be manually operable in the second direction.

6. The dust collector as defined in claim 1, wherein the sliding part includes:

a pair of guide rails spaced apart from each other and extending generally in parallel in the first direction, and a positioning member held by the pair of guide rails so as to be movable in the first direction with respect to the sliding part, the positioning member being configured to engage with the pair of guide rails and to adjust a protrusion length or an insertion length of the sliding part from the opening in the first direction.

7. The dust collector as defined in claim 1, wherein:

the dust transfer passage includes a first part and a second part, the first part extending in the first direction within the sliding part, and the second part extending in the second direction and connecting the first part and the dust storing region, the second part is disposed between the communication passage and the opening in the first direction, and the sliding part includes a transfer passage interference avoiding part configured to avoid interference with the second part when the sliding part is placed at the closest position.

8. The dust collector as defined in claim 7, wherein the transfer passage interference avoiding part is configured as a space formed in the sliding part, the transfer passage interference avoiding part extending from the dust storing region side toward the power tool side in the second direction and extending continuously up to the innermost end in the first direction, and the transfer passage interference avoiding part includes at least a region in which the second part is disposed when the sliding part is placed at the closest position.

9. The dust collector as defined in claim 1, further comprising a conductive member disposed in the internal region and connected to the dust storing region via a conductive path.

10. A power tool configured to perform a processing operation on a workpiece by driving a tool accessory, the power tool comprising:

a fan configured to generate an air flow for sucking dust generated during the processing operation, a tool body housing the fan and including a passage for the air flow, and a dust collector as defined in claim 1 removably attached to the tool body.

11. The dust collector as defined in claim 1, wherein:

the main body has a sliding guide that extends in the first direction inside the main body; and a side part of the sliding part has an engagement part that is configured to slidably engage with the sliding guide.

12. The dust collector as defined in claim 1, wherein:

the sliding part and the communication passage transversely overlap, and the second direction is a flow direction through the communication passage.

13. A dust collector configured to be removably attached to a power tool for performing a processing operation on a workpiece by driving a tool accessory and to collect dust generated during the processing operation by utilizing an air flow generated by the power tool, the dust collector comprising:

a main body configured to be removably attached to the power tool, the main body including a dust storing region, an internal region, and an opening, the dust storing region being configured to store the dust, the internal region being disposed between the power tool and the dust storing region when the dust collector is attached to the power tool, and the opening providing communication between the internal region and outside of the main body, a sliding part having an elongate shape and held by the main body so as to be slidable in a specified first direction while partly protruding out of the main body through the opening and partly disposed in the internal region, the sliding part having a suction port for the dust and at least part of a dust transfer passage, the dust transfer passage connecting the suction port and the dust storing region and allowing the dust to be transferred therethrough, and a tubular member extending in a second direction crossing the first direction within the internal region and having two opposite ends respectively connected to an outlet of the dust storing region and an inlet of a passage for the air flow formed in the power tool, when the dust collector is attached to the power tool, the tubular member defining a communication passage between the dust storing region and the passage of the power tool, wherein:

the sliding part is movable with respect to the main body in the first direction between a farthest position and a closest position, the farthest position being a position in which the suction port is located farthest away from the opening, and the closest position being a position in which the suction port is located closest to the opening, when the sliding part is placed at the closest position, a distance in the first direction between the opening and an innermost end of the sliding part is longer than a distance between the opening and the tubular member in the first direction, the innermost end being an end of the sliding part located at an innermost position in the main body with respect to the opening, the sliding part includes an interference avoiding part configured to avoid interference with the tubular member when the sliding part is placed at the closest position, the interference avoiding part is configured as a space formed in the sliding part, the space extending through the sliding part in the second direction and extending continuously up to the innermost end in the first direction, and when the sliding part is placed at the closest position, the tubular member extends through the space such that the two opposite ends protrude from the sliding part in the second direction.

14. The dust collector as defined in claim 13, wherein the space is configured such that at least one end of the space in the second direction is located in the internal region when the sliding part is placed at the farthest position, the one end of the space being disposed on the power tool side in the second direction when the dust collector is attached to the power tool.

15. The dust collector as defined in claim 13, wherein the main body includes:
    an engagement part provided on a power tool side of the main body, the power tool side facing the power tool in the second direction when the dust collector is attached to the power tool, the engagement part being configured to be removably engaged with a tool body of the power tool; and
    an operation member provided on the same side as the engagement part in the second direction and configured to switch between a first state and a second state in response to an external manual operation, the first state maintaining engagement between the tool body and the engagement part and the second state allowing release of the engagement.

16. The dust collector as defined in claim 15, wherein the operation member is configured to be manually operable in the second direction.

17. The dust collector as defined in claim 13, wherein the sliding part includes:
    a pair of guide rails spaced apart from each other and extending generally in parallel in the first direction, and
    a positioning member held by the pair of guide rails so as to be movable in the first direction with respect to the sliding part, the positioning part being configured to engage with the pair of guide rails and to adjust a protrusion length or an insertion length of the sliding part from the opening in the first direction.

18. The dust collector as defined in claim 13, wherein:
    the dust transfer passage includes a first part and a second part, the first part extending in the first direction within the sliding part, and the second part extending in the second direction and connecting the first part and the dust storing region,
    the second part is disposed between the communication passage and the opening in the first direction, and
    the sliding part includes a transfer passage interference avoiding part configured to avoid interference with the second part when the sliding part is placed at the closest position.

19. The dust collector as defined in claim 18, wherein the transfer passage interference avoiding part is configured as a space formed in the sliding part, the transfer passage interference avoiding part extending from the dust storing region side toward the power tool side in the second direction and extending continuously up to the innermost end in the first direction, and
    the transfer passage interference avoiding part includes at least a region in which the second part is disposed when the sliding part is placed at the closest position.

20. The dust collector as defined in claim 13, wherein:
    the main body has a sliding guide that extends in the first direction inside the main body; and
    a side part of the sliding part has an engagement part that is configured to slidably engage with the sliding guide.

* * * * *